United States Patent
Tae et al.

(10) Patent No.: US 10,036,924 B2
(45) Date of Patent: Jul. 31, 2018

(54) CURVED LIQUID CRYSTAL DISPLAY

(71) Applicant: SAMSUNG DISPLAY CO., LTD., Yongin Si, Gyeonggi-Do (KR)

(72) Inventors: Changil Tae, Seoul (KR); Suwan Woo, Osan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 15/050,252

(22) Filed: Feb. 22, 2016

(65) Prior Publication Data
US 2016/0246135 A1  Aug. 25, 2016

(30) Foreign Application Priority Data
Feb. 24, 2015 (KR) .................. 10-2015-0025976

(51) Int. Cl.
*G02F 1/1343* (2006.01)
*G02F 1/1337* (2006.01)

(52) U.S. Cl.
CPC .. *G02F 1/133753* (2013.01); *G02F 1/133707* (2013.01); *G02F 2001/133757* (2013.01); *G02F 2001/134345* (2013.01)

(58) Field of Classification Search
None
See application file for complete search history.

(56) References Cited

U.S. PATENT DOCUMENTS

| | | | |
|---|---|---|---|
| 2009/0002618 A1* | 1/2009 | Lee | G02F 1/133707 349/129 |
| 2010/0157186 A1* | 6/2010 | Kim | G02F 1/134336 349/39 |
| 2012/0307190 A1* | 12/2012 | Zhang | G02F 1/133707 349/142 |
| 2014/0049737 A1 | 2/2014 | Nagami | |
| 2015/0009465 A1* | 1/2015 | Park | G02F 1/133707 349/139 |
| 2015/0029449 A1* | 1/2015 | Woo | G02F 1/133512 349/110 |
| 2015/0036073 A1* | 2/2015 | Im | G02F 1/1333 349/48 |

(Continued)

FOREIGN PATENT DOCUMENTS

KR  10-2008-0014317 A  2/2008
KR  10-2009-0118391 A  11/2009
(Continued)

*Primary Examiner* — Ryan Crockett
(74) *Attorney, Agent, or Firm* — Innovation Counsel, LLP

(57) ABSTRACT

A liquid crystal display includes a display substrate having pixel electrodes and a curvature along a first direction, an opposite substrate coupled to the display substrate and curved together with the display substrate, and a liquid crystal layer interposed between the display substrate and the opposite substrate. Each pixel electrode comprises a plurality of domains successively arranged along a second direction substantially perpendicular to the first direction, and further comprises branch electrodes positioned within each domain to be inclined with respect to the first and second directions, the branch electrodes of two domains adjacent to each other in the second direction being arranged in alternating manner.

22 Claims, 21 Drawing Sheets

(56) References Cited

U.S. PATENT DOCUMENTS

2015/0055063 A1* 2/2015 Hsieh ................ G02F 1/133753
                                                                        349/99
2016/0116806 A1* 4/2016 Shin .................. G02F 1/134309
                                                                        349/138

FOREIGN PATENT DOCUMENTS

| KR | 10-2011-0008422 A | 1/2011 |
| KR | 10-1457658 B1 | 10/2014 |

\* cited by examiner

FIG. 10A

CURVED LIQUID CRYSTAL DISPLAY

CROSS-REFERENCE TO RELATED APPLICATION

This U.S. non-provisional patent application claims priority under 35 U.S.C. § 119 to Korean Patent Application No. 10-2015-0025976 filed on Feb. 24, 2015, the contents of which are hereby incorporated by reference in their entirety.

BACKGROUND

1. Field of Disclosure

Embodiments of the present disclosure relate generally to liquid crystal displays. More particularly, embodiments of the present disclosure relate to liquid crystal displays having a curved shape.

2. Description of the Related Art

A liquid crystal display includes a liquid crystal layer interposed between two transparent substrates, and drives liquid crystal molecules of the liquid crystal layer to control a transmittance of light passing through the liquid crystal layer in each pixel, thereby displaying a desired image.

In a vertical alignment mode liquid crystal display, the liquid crystal molecules of the liquid crystal layer are vertically aligned with respect to the two substrates when an electric field is formed between the two substrates, and the vertically aligned liquid crystal molecules transmit the light, to thereby display the image. The vertical alignment mode liquid crystal display includes liquid crystal domains required to align the liquid crystal molecules in different directions, and thus a viewing angle of the liquid crystal display is improved.

In recent years, a curved liquid crystal display has been developed, where this curved liquid crystal display provides images having improved three-dimensional effect, sense of immersion (or immersiveness), and presence to a viewer.

SUMMARY

The present disclosure provides a liquid crystal display having a curved shape, which is capable of preventing upper and lower substrates from being misaligned with each other, and having improved liquid crystal control force in each domain to enhance the overall transmittance.

Embodiments of the inventive concept provide a liquid crystal display including a display substrate including a plurality of pixel electrodes and having a curvature along a first direction, an opposite substrate facing the display substrate, coupled to the display substrate, and curved corresponding to the display substrate, and a liquid crystal layer interposed between the display substrate and the opposite substrate. Each pixel electrode comprises a plurality of domains successively arranged along a second direction substantially perpendicular to the first direction, and further comprises branch electrodes positioned within each domain to be inclined with respect to the first and second directions, the branch electrodes of two domains adjacent to each other in the second direction being arranged in alternating manner.

According to the above, the domains are arranged in the second direction crossing the first direction in which the liquid crystal display is curved, and the branch electrodes in two domains disposed adjacent to each other along the second direction are arranged in alternating manner.

Therefore, although misalignment caused by the curved shape of the liquid crystal display occurs between the upper and lower substrates, the domains are prevented from overlapping each other in the first direction, and thus the liquid crystal molecules may be prevented from being abnormally aligned due to the misalignment.

In addition, the branch electrodes of two domains adjacent to each other are alternately arranged with each other. Thus, the liquid crystal control force is improved in each domain and the overall transmittance of the liquid crystal display is improved.

BRIEF DESCRIPTION OF THE DRAWINGS

The above and other advantages of the present disclosure will become readily apparent by reference to the following detailed description when considered in conjunction with the accompanying drawings, wherein:

FIG. 10A is a view showing a liquid crystal alignment state according to a time lapse in a non-alternating branch electrode structure;

DETAILED DESCRIPTION

Figure 1A:
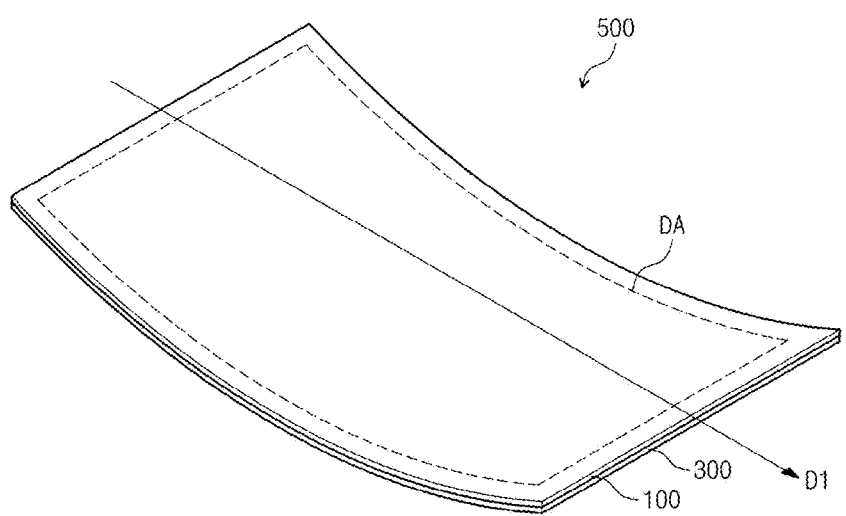
FIG. 1A is a perspective view showing a liquid crystal display according to an exemplary embodiment of the present disclosure.

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The various Figures are not to scale. All numerical values are approximate, and may vary. All examples of specific materials and compositions are to be taken as nonlimiting and exemplary only. Other suitable materials and compositions may be used instead.

Hereinafter, the present invention will be explained in detail with reference to the accompanying drawings.

Figure 1B:
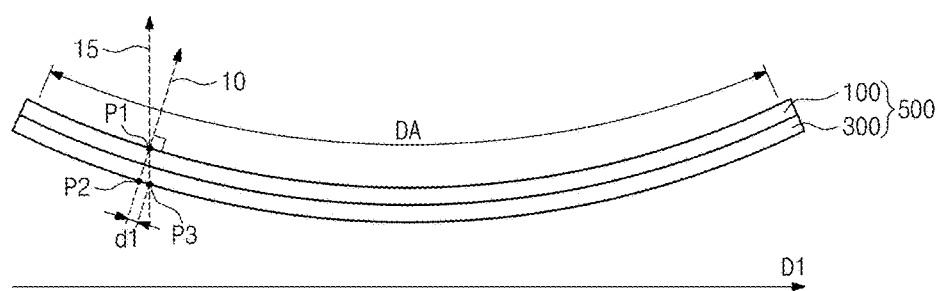
FIG. 1B is a side view of the liquid crystal display shown in FIG. 1A.

FIG. 1A is a perspective view showing a liquid crystal display 500 according to an exemplary embodiment of the present disclosure and FIG. 1B is a side view of the liquid crystal display shown in FIG. 1A.

Referring to FIG. 1A, the liquid crystal display 500 includes a display area DA through which an image is displayed and which has a curved shape. Thus, the curved liquid crystal display 500 provides an image having improved three-dimensional effect, sense of immersion (or immersiveness), and presence to a viewer.

The liquid crystal display 500 includes a display substrate 100, an opposite substrate 300, and a liquid crystal layer. The opposite substrate 300 faces the display substrate 100 and is coupled to the display substrate 100, and the liquid crystal layer is interposed between the display substrate 100 and the opposite substrate 300.

The liquid crystal display 500 may further include other elements in addition to the display substrate 100 and the opposite substrate 300. For instance, the liquid crystal display 500 may further include a backlight assembly (not shown) providing a light to the display substrate 100 and the opposite substrate 300. However, the structure of the liquid crystal display 500 should not be limited thereto or thereby.

The liquid crystal display 500 is bent along a first direction D1 when viewed in a plan view. Thus, a portion or an entirety of the display substrate 100 is bent along the first direction D1, and the display area DA has a curved shape along the first direction D1 (i.e. has a height or elevation that varies as a function of position along direction D1). Also, the opposite substrate 300 has a curved shape to correspond to the curved shape of the display substrate 100.

As shown in FIG. 1B, when a first point P1 is defined at a position along a side surface of the display substrate 100, a normal line 10 crossing the first point P1 crosses a second point P2 of the opposite substrate 300. In addition, a gaze line 15, which is substantially parallel to a user's view direction, is defined at the first point P1 and the gaze line 15 crosses a third point P3 of the opposite substrate 300. In this case, since the display substrate 100 and the opposite substrate 300 have a curved shape, a position of the second point P2 may be different from that of the third point P3 in the opposite substrate 300.

A first distance d1 between the second point P2 and the third point P3 varies depending on a curvature of the liquid crystal display 500. That is, as the curvature of the liquid crystal display 500 increases, the first distance d1 becomes greater.

As described above, a phenomenon in which the first distance d1 occurs between the second point P2 and the third point P3 due to the curved shape of the display substrate 100 and the opposite substrate 300 is called a misalignment between the display substrate 100 and the opposite substrate 300. Hereinafter, a structure of the liquid crystal display 500, which prevents an alignment control force of liquid crystal molecules or an aperture ratio from deteriorating due to the misalignment and improves a display quality of the image displayed in the liquid crystal display 500, will be described in detail.

Figure 2A:
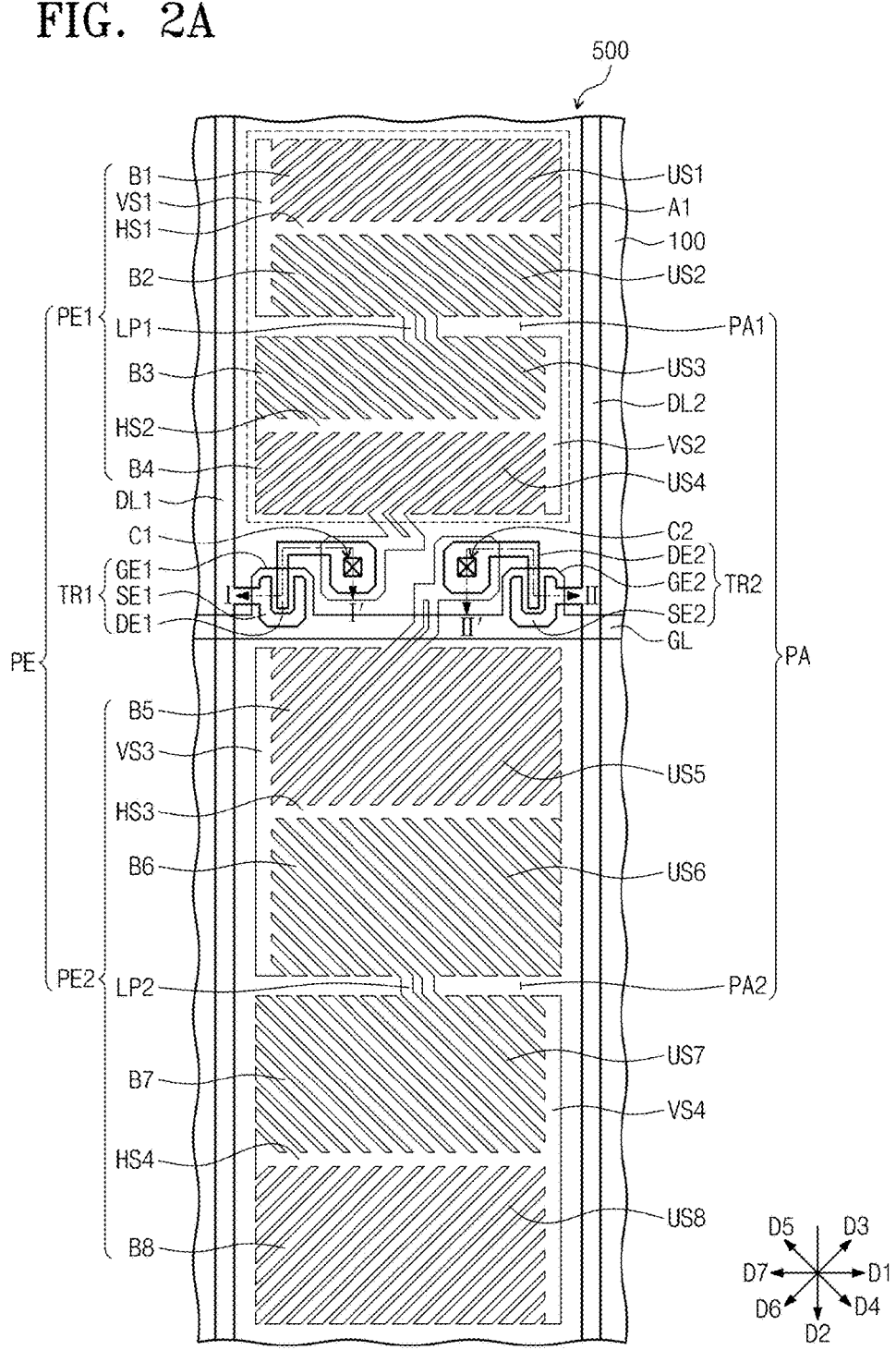
FIG. 2A is a plan view showing a pixel of the liquid crystal display shown in FIG. 1A.
Figure 2B:
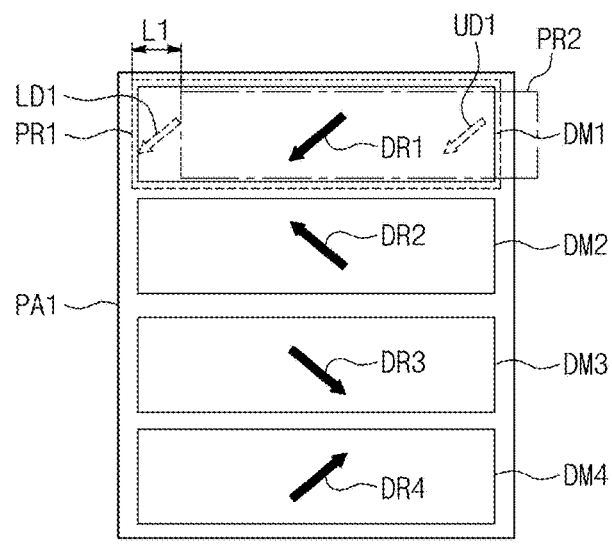
FIG. 2B is a view showing domains and liquid crystal alignment directions which are defined in a pixel area shown in FIG. 2A.
Figure 2B:
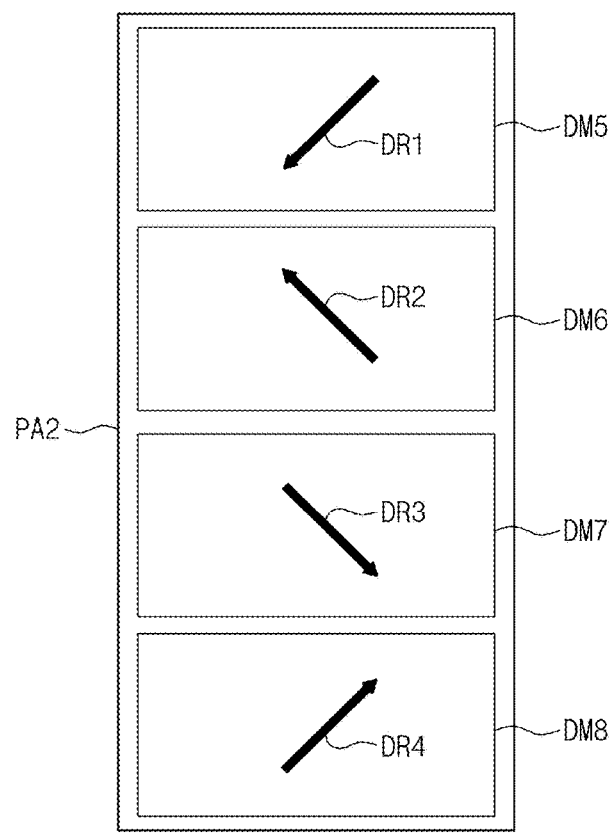
Figure 2B:
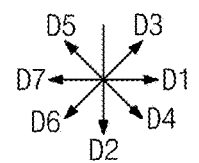
Figure 2C:
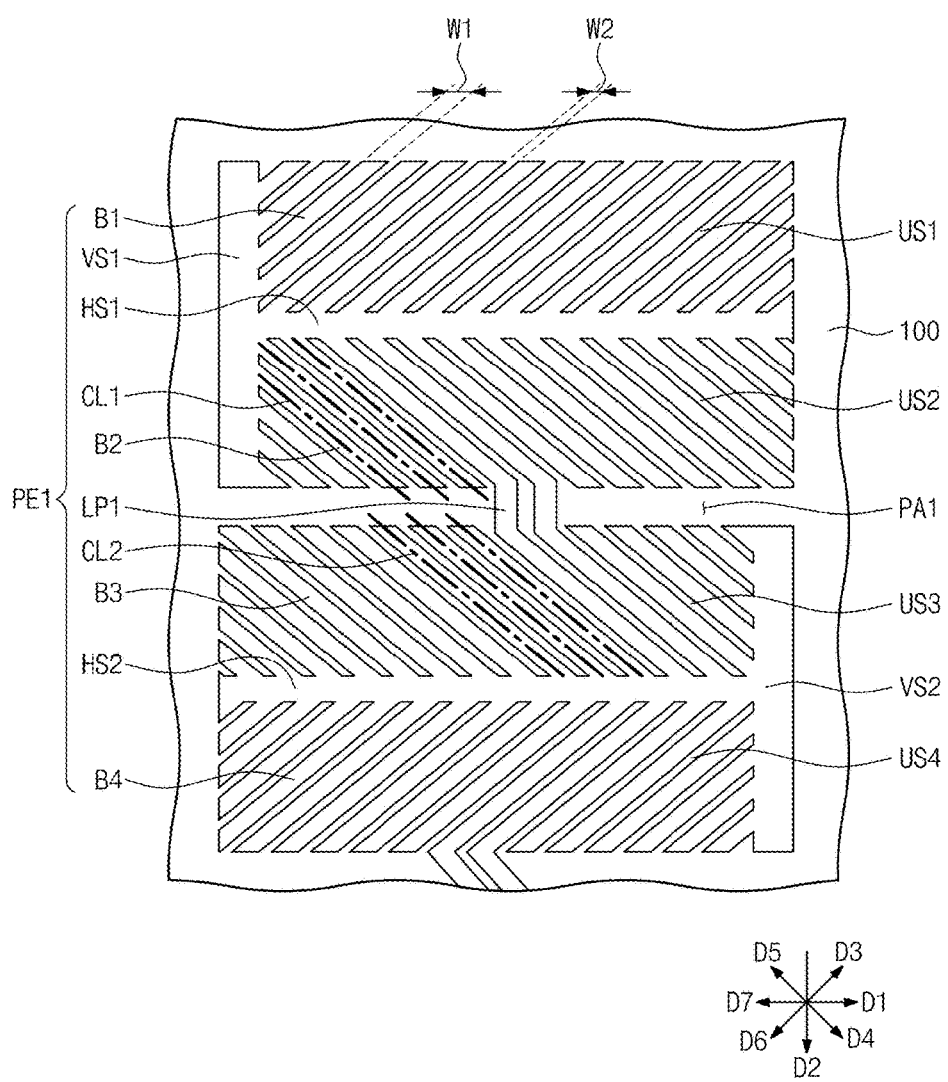
FIG. 2C is an enlarged view of a portion A1 shown in FIG. 2A.

FIG. 2A is a plan view showing a pixel of the liquid crystal display shown in FIG. 1A, FIG. 2B is a diagram showing domains and liquid crystal alignment directions which are defined in a pixel area shown in FIG. 2A, and FIG. 2C is an enlarged view of a portion A1 shown in FIG. 2A.

The liquid crystal display 500 includes a plurality of pixels. However, FIG. 2A shows only one pixel area PA, and the other pixels and the other pixel areas will be omitted from FIG. 2A for ease of explanation. In addition, FIG. 2A shows a structure in which the pixel area PA is divided into two sub-pixel areas, but the pixel area PA may have a structure in which the pixel area PA is not divided into two sub-pixel areas.

Referring to FIG. 2A, the pixel includes a gate line GL, a first data line DL1, a second data line DL2, a first thin film transistor TR1, a second thin film transistor TR2, and a pixel electrode PE.

The gate line GL extends generally in the first direction D1, and the first and second data lines DL1 and DL2 extend generally in a second direction D2 substantially perpendicular to the first direction D1. The gate line GL is electrically connected to the first and second thin film transistors TR1 and TR2 to apply a gate signal to the first and second thin film transistors TR1 and TR2.

An area where the pixel electrode PE is formed is defined as the pixel area PA, and the pixel area PA includes a first sub-pixel area PA1 and a second sub-pixel area PA2. The first and second sub-pixel areas PA1 and PA2 are arranged along the second direction D2. The pixel electrode PE includes a first sub-pixel electrode PE1 disposed in the first sub-pixel area PA1 and a second sub-pixel electrode PE2 disposed in the second sub-pixel area PA2.

The first data line DL1 applies a first data signal to the first thin film transistor TR1 and the second data line DL2 applies a second data signal to the second thin film transistor TR2. The first data line DL1 extends along one side of the first and second sub-pixel electrodes PE1 and PE2, and the second data line DL2 extends along the opposite side of the first and second sub-pixel electrodes PE1 and PE2. The first and second sub-pixel electrodes PE1 and PE2 are thus disposed between the first data line DL1 and the second data line DL2.

The first thin film transistor TR1 is electrically connected to the gate line GL, the first data line DL1, and the first sub-pixel electrode PE1. When the first thin film transistor TR1 is turned on in response to the gate signal from gate line GL, the first data signal is applied to the first sub-pixel electrode PE1 through the turned-on first thin film transistor TR1.

The first thin film transistor TR1 includes a first gate electrode GE1, a first source electrode SE1, and a first drain electrode DE1. The first gate electrode GE1 extends or protrudes from the gate line GL. The first source electrode SE1 protrudes from the first data line DL1 and is disposed on the first gate electrode GE1, and the first drain electrode DE1 is disposed on the first gate electrode GE1 and spaced apart from the first source electrode SE1. The first sub-pixel electrode PE1 makes contact with the first drain electrode DE1 through a first contact hole C1.

The second thin film transistor TR2 is electrically connected to the gate line GL, the second data line DL2, and the second sub-pixel electrode PE2. When the second thin film transistor TR2 is turned on in response to the gate signal from gate line GL, the second data signal is applied to the second sub-pixel electrode PE2 through the turned-on second thin film transistor TR2.

The second thin film transistor TR2 includes a second gate electrode GE2, a second source electrode SE2, and a second drain electrode DE2. The second gate electrode GE2 extends out from the gate line GL. The second source electrode SE2 extends from the second data line DL2 and is disposed on the second gate electrode GE2, and the second drain electrode DE2 is disposed on the second gate electrode GE2 and spaced apart from the second source electrode SE2. The second sub-pixel electrode PE2 makes contact with the second drain electrode DE2 through a second contact hole C2.

As described above, since the first and second sub-pixel electrodes PE1 and PE2 are respectively driven by differing first and second data signals, a grayscale level of the image displayed in the first sub-pixel area PA1 is different from a grayscale level of the image displayed in the second sub-pixel area PA2.

As shown in FIG. 2A, a size of the first sub-pixel electrode PE1 is different from a size of the second sub-pixel electrode PE2. As an exemplary embodiment of the present disclosure, the first sub-pixel electrode PE1 has a size smaller than that of the second sub-pixel electrode PE2. In this case, the first data signal has a grayscale level higher than that of the second data signal.

Referring to FIG. 2B, the first sub-pixel area PA1 includes a first domain DM1, a second domain DM2, a third domain DM3, and a fourth domain DM4, which are sequentially arranged along the second direction D2. The second sub-pixel area PA2 includes a fifth domain DM5, a sixth domain DM6, a seventh domain DM7, and an eighth domain DM8, which are sequentially arranged along the second direction D2.

The liquid crystal molecules of the first to fourth domains DM1 to DM4 are aligned in response to an electric field formed between the first sub-pixel electrode PE1 and a common electrode. Here, liquid crystal alignment directions in the first to fourth domains DM1 to DM4 are defined as a first liquid crystal alignment direction DR1, a second liquid crystal alignment direction DR2, a third liquid crystal alignment direction DR3, and a fourth liquid crystal alignment direction DR4, respectively. Details on the first to fourth liquid crystal alignment directions DR1 to DR4 will be described with reference to FIGS. 4A to 4D.

The liquid crystal molecules of the fifth to eighth domains DM5 to DM8 are aligned in response to an electric field formed between the second sub-pixel electrode PE2 and the common electrode. Here, liquid crystal alignment directions of the fifth to eighth domains DM5 to DM8 are defined as a fifth liquid crystal alignment direction DR5, a sixth liquid crystal alignment direction DR6, a seventh liquid crystal alignment direction DR7, and an eighth liquid crystal alignment direction DR8, respectively.

Referring to FIGS. 2A to 2C, the first sub-pixel electrode PE1 includes a first horizontal trunk electrode HS1, a second horizontal trunk electrode HS2, a first vertical trunk electrode VS1, a second vertical trunk electrode VS2, and first, second, third, and fourth branch electrodes B1, B2, B3, and B4.

Each of the first and second vertical trunk electrodes VS1 and VS2 extends in the second direction D2, and the second direction D2 crosses the first direction D1 in which the liquid crystal display 500 is curved. That is, the second direction D2 is substantially perpendicular to the first direction D1 when viewed in a plan view.

The first vertical trunk electrode VS1 is disposed at one side of the first and second domains DM1 and DM2, e.g., the side adjacent to the first data line DL1, and the second vertical trunk electrode VS2 is disposed at the other side of the third and fourth domains DM3 and DM4, e.g., the side adjacent to the second data line DL2.

The first horizontal trunk electrode HS1 is disposed between the first and second domains DM1 and DM2 and extends in the first direction D1 outward or away from a center portion of the first vertical trunk electrode VS1. Thus, the first vertical trunk electrode VS1 and the first horizontal trunk electrode HS1 form a T shape which is rotated in a counter clockwise direction by about 90 degrees.

A portion of the first branch electrodes B1 extends from the first horizontal trunk electrode HS1 and the other portion of the first branch electrodes B1 extends from the first vertical trunk electrode VS1. In addition, each of the first branch electrodes B1 extends in a third direction D3 which is inclined with respect to the first and second directions D1 and D2 when viewed in plan view. Successive first branch electrodes B1 are arranged along the first direction D1 and spaced apart from each other.

A portion of the second branch electrodes B2 extends from the first horizontal trunk electrode HS1 and the other portion of the second branch electrodes B2 extends from the first vertical trunk electrode VS1. In addition, each of the second branch electrodes B2 extends in a fourth direction D4 which is inclined with respect to the first and second directions D1 and D2 when viewed in plan view. Successive second branch electrodes B2 are arranged along the first direction D1 and spaced apart from each other.

The third direction D3 is inclined in a counter-clockwise direction with respect to the first direction D1, and the fourth direction D4 is inclined in a clockwise direction with respect to the first direction D1. A first angle which is an included angle formed between the first direction D1 and the third direction D3 is about +45 degrees, and a second angle which is an included angle formed between the first direction D1 and the fourth direction D4 is about −45 degrees. Thus, the third direction D3 is substantially perpendicular to the fourth direction D4 when viewed in a plan view.

The first branch electrodes B1 are arranged in alternating manner with the second branch electrodes B2 along the first horizontal trunk electrode HS1. In detail, when a space formed between adjacent first branch electrodes B1 is referred to as a first slit US1, the second branch electrodes B2 and the first slits US1 are symmetrically disposed with respect to the first horizontal trunk electrode HS1, and the second branch electrodes B2 and the first branch electrode B1 are not symmetrically disposed with respect to the first horizontal trunk electrode HS1. When a space formed between adjacent second branch electrodes B2 is referred to as a second slit US2, the first branch electrodes B1 and the second slits US2 are symmetrically disposed with respect to the first horizontal trunk electrode HS1, and the second branch electrodes B2 and the first branch electrode B1 are not symmetrically disposed with respect to the first horizontal trunk electrode HS1. In the present exemplary embodiment, each of the first and second slits US1 and US2 has a width measured on the order of micrometers, although any size is contemplated.

The second horizontal trunk electrode HS2 is disposed between the third and fourth domains DM3 and DM4 and protrudes in the first direction D1 to extend from a center portion of the second vertical trunk electrode VS2. Thus, the second vertical trunk electrode VS2 and the second horizontal trunk electrode HS2 form a T shape, which is rotated in a counter-clockwise direction by about 90 degrees.

A portion of the third branch electrodes B3 extends from the second horizontal trunk electrode HS2 and the other portion of the third branch electrodes B3 extends from the second vertical trunk electrode VS2. In addition, each of the third branch electrodes B3 extends in a fifth direction D5 which is inclined with respect to the first and second directions D1 and D2 when viewed in plan view. Successive third branch electrodes B3 are arranged along the first direction D1 and spaced apart from each other.

A portion of the fourth branch electrodes B4 extends from the second horizontal trunk electrode HS2 and the other portion of the fourth branch electrodes B4 extends from the second vertical trunk electrode VS2. In addition, each of the fourth branch electrodes B4 extends in a sixth direction D6 which is inclined with respect to the first and second directions D1 and D2 when viewed in plan view. The fourth branch electrodes B4 are oriented to extend along the first direction D1 and spaced apart from each other.

The fifth direction D5 is opposite to the fourth direction D4, and the sixth direction D6 is opposite to the third direction D3. When viewed in plan view, the sixth direction D6 crosses the fifth direction D5. For instance, the fifth direction D5 is substantially perpendicular to the sixth direction D6 when viewed in plan view.

The third branch electrodes B3 are arranged in alternating manner with the fourth branch electrodes B4 along the second horizontal trunk electrode HS2. In detail, when a space formed between adjacent third branch electrodes B3 is referred to as a third slit US3, the fourth branch electrodes B4 and the third slits US3 are symmetrically disposed with respect to the second horizontal trunk electrode HS2. When a space formed between adjacent fourth branch electrodes B4 is referred to as a fourth slit US4, the third branch electrodes B3 and the fourth slits US4 are symmetrically disposed with respect to the second horizontal trunk electrode HS2. The fourth branch electrodes B4 and the third branch electrodes B3 are not symmetrically disposed with respect to the second horizontal trunk electrode HS2.

The second branch electrodes B2 of the second domain DM2 are arranged in alternating manner with the third branch electrodes B3 of the third domain DM3. In detail, first center lines CL1 of the second branch electrodes B2 are arranged in alternating manner with second center lines CL2 of the third branch electrodes B3.

Referring to FIG. 2C, each of the first to fourth branch electrodes B1 to B4 has a first width w1, each of the first to fourth slits US1 to US4 has a second width w2, and the first width w1 is greater than the second width w2. Each of the second branch electrodes B2 is shifted from the corresponding first branch electrode B1 in the first direction D1, and the amount of shift is about a half (w½) of the first width w1 or less. In addition, each of the third branch electrodes B3 is shifted from the corresponding second branch electrode B2 in the seventh direction D7, and the amount of shift is about a half (w½) of the first width w1 or less. Each of the fourth branch electrodes B4 is shifted from the corresponding third branch electrode B3 in the first direction D1, and the fourth branch electrodes B4 are shifted by about a half (w½) of the first width w1 or less.

As described above, since the branch electrodes in the domains disposed adjacent to each other are arranged in alternating manner, an electric field applied to the liquid crystal molecules is dispersed at a border area between two domains and a liquid crystal alignment control force is thus improved in an outer portion of the domains. For instance, the liquid crystal molecules disposed between the first branch electrodes B1 and the second slit US2 are controlled to be aligned toward the first branch electrodes B1 at a border area between the first and second domains DM1 and DM2. Similarly, liquid crystal molecules which are disposed between the second branch electrodes B2 and the first slit US1 are controlled to be aligned toward the second branch electrodes B2 at the border area between the first and second domains DM1 and DM2. Therefore, the liquid crystal alignment control force is improved in the border area between two domains and a distance between domains is reduced, to thereby improve a transmittance of each pixel.

Referring again to FIG. 2A, the second sub-pixel electrode PE2 has a size different from that of the first sub-pixel electrode PE1. However, the second sub-pixel electrode PE2 has a shape similar to that of the first sub-pixel electrode PE1.

The second sub-pixel electrode PE2 includes a third horizontal trunk electrode HS3, a fourth horizontal trunk electrode HS4, a third vertical trunk electrode VS3, a fourth vertical trunk electrode VS4, and fifth, sixth, seventh, and eighth branch electrodes B5, B6, B7, and B8.

Each of the third and fourth vertical electrodes VS3 and VS4 extends in the second direction D2. The third vertical trunk electrode VS3 is disposed at one side of the fifth and sixth domains DM5 and DM6, e.g., to the side nearest the first data line DL1, and the fourth vertical trunk electrode VS4 is disposed at the other side of the seventh and eighth domains DM7 and DM8, e.g., the side nearest the second data line DL2.

The third horizontal trunk electrode HS3 is disposed between the fifth and sixth domains DM5 and DM6 and protrudes in the first direction D1 to extend from a center portion of the third vertical trunk electrode VS3.

A portion of the fifth branch electrodes B5 extends from the third horizontal trunk electrode HS3 and the other portion of the fifth branch electrodes B5 extends from the third vertical trunk electrode VS3. In addition, each of the fifth branch electrodes B5 extends in the third direction D3 when viewed in plan view, and successive fifth branch electrodes B5 are arranged along the first direction D1 and spaced apart from each other.

A portion of the sixth branch electrodes B6 extends from the third horizontal trunk electrode HS3 and the other portion of the sixth branch electrodes B6 extends from the third vertical trunk electrode VS3. Each of the sixth branch electrodes B6 extends in the fourth direction D4 when viewed in plan view. Successive sixth branch electrodes B6 are arranged along the first direction D1 and spaced apart from each other.

The fifth branch electrodes B5 of the fifth domain DM5 are arranged in alternating manner with the sixth branch electrodes B6 of the sixth domain DM6. In detail, when a space formed between adjacent fifth branch electrodes B5 is referred to as a fifth slit US5, the sixth branch electrodes B6 and the fifth slits US5 are symmetrically disposed with respect to the third horizontal trunk electrode HS3. When a space formed between adjacent sixth branch electrodes B6 is referred to as a sixth slit US6, the fifth branch electrodes B5 and the sixth slits US6 are symmetrically disposed with respect to the third horizontal trunk electrode HS3. The fifth branch electrodes B5 and the sixth branch electrodes B6 are not symmetrically disposed with respect to the third horizontal trunk electrode HS3.

The fourth horizontal trunk electrode HS4 is disposed between the seventh and eighth domains DM7 and DM8 and extends in the first direction D1 to protrude from a center portion of the fourth vertical trunk electrode VS4.

A portion of the seventh branch electrodes B7 extends from the fourth horizontal trunk electrode HS4 and the other portion of the seventh branch electrodes B7 extends from the fourth vertical trunk electrode VS4. Each of the seventh branch electrodes B7 extends in the fifth direction D5 when viewed in plan view, and successive seventh branch electrodes B7 are arranged along the first direction D1 and spaced apart from each other.

A portion of the eighth branch electrodes B8 extends from the fourth horizontal trunk electrode HS4 and the other portion of the eighth branch electrodes B8 extends from the fourth vertical trunk electrode VS4. Each of the eighth branch electrodes B8 extends in the sixth direction D6 when viewed in plan view, and successive eighth branch electrodes B8 are arranged along the first direction D1 and spaced apart from each other.

The seventh branch electrodes B7 of the seventh domain DM7 are arranged in alternating manner with the eighth branch electrodes B8 of the eighth domain DM8. In detail, when a space formed between adjacent seventh branch electrodes B7 is referred to as a seventh slit US7, the eighth branch electrodes B8 and the seventh slits US7 are symmetrically disposed with respect to the fourth horizontal trunk electrode HS4. When a space formed between adjacent eighth branch electrodes B8 is referred to as an eighth slit US8, the seventh branch electrodes B7 and the eighth slits US8 are symmetrically disposed with respect to the fourth horizontal trunk electrode HS4. The seventh branch electrodes B7 and the eighth branch electrodes B8 are not symmetrically disposed with respect to the fourth horizontal trunk electrode HS3.

The sixth branch electrodes B6 of the sixth domain DM6 are arranged in alternating manner with the seventh branch electrodes B7 of the seventh domain DM7. In detail, third center lines of the sixth branch electrodes B6 are arranged in alternating manner with fourth center lines of the seventh branch electrodes B7.

In addition, the first sub-pixel electrode PE1 further includes a first domain connection electrode LP1, and the second sub-pixel electrode PE2 further includes a second domain connection electrode LP2.

The first domain connection electrode LP1 is disposed between the second domain DM2 and the third domain DM3 to electrically connect the second branch electrodes B2 and the third branch electrodes B3. The second domain connection electrode LP2 is disposed between the sixth domain DM6 and the seventh domain DM7 to electrically connect the sixth branch electrodes B6 and the seventh branch electrodes B7. The first domain connection electrode LP1 is disposed at a center of a border area between the second and the third domains DM2 and DM3, and the second domain connection electrode LP2 is disposed at a center of a border area between the sixth and the seventh domains DM6 and DM7. As an example, the first and second domain connection electrodes LP1 and LP2 each extend substantially parallel to the second direction D2.

The liquid crystal molecules are aligned in the first liquid crystal alignment direction DR1 in the first domain DM1 by the first branch electrodes B1, and the liquid crystal molecules are aligned in the second liquid crystal alignment direction DR2 in the second domain DM2 by the second branch electrodes B2. In the present exemplary embodiment, the first and second liquid crystal alignment directions DR1 and DR2 correspond to the sixth direction D6 and the fifth direction D5, respectively.

The liquid crystal molecules are aligned in the third liquid crystal alignment direction DR3 in the third domain DM3 by the third branch electrodes B3, and the liquid crystal molecules are aligned in the fourth liquid crystal alignment direction DR4 in the fourth domain DM4 by the fourth branch electrodes B4. In the present exemplary embodiment, the third and fourth liquid crystal alignment directions DR3 and DR4 correspond to the fourth and third directions D4 and D3, respectively.

As described above, the first to fourth domains DM1 to DM4, which are sequentially arranged along the second direction D2, are arranged in the first sub-pixel area PA1, and the liquid crystal alignment directions in the first to fourth domains DM1 to DM4 are different from each other. Thus, a viewing angle of the first sub-pixel area PA1 may be widened.

Also, the fifth to eighth domains DM5 to DM8, which are sequentially aligned along the second direction D2, are arranged in the second sub-pixel area PA2, and the liquid crystal alignment directions in the fifth to eighth domains DM5 to DM8 are different from each other. Thus, a viewing angle of the second sub-pixel area PA2 may also be widened.

In the liquid crystal display 500 curved in the first direction D1, the first to eighth domains DM1 to DM8 of one pixel are arranged along the second direction D2 substantially perpendicular to the first direction D1. Thus, domains having different liquid crystal alignment directions are prevented from overlapping each other in the first direction D1 due to misalignment between the two substrates 100 and 300 of the liquid crystal display 500 curved in the first direction D1. Consequently, texture defects caused by misalignment of the liquid crystal molecules may be prevented from occurring.

Figure 3A:
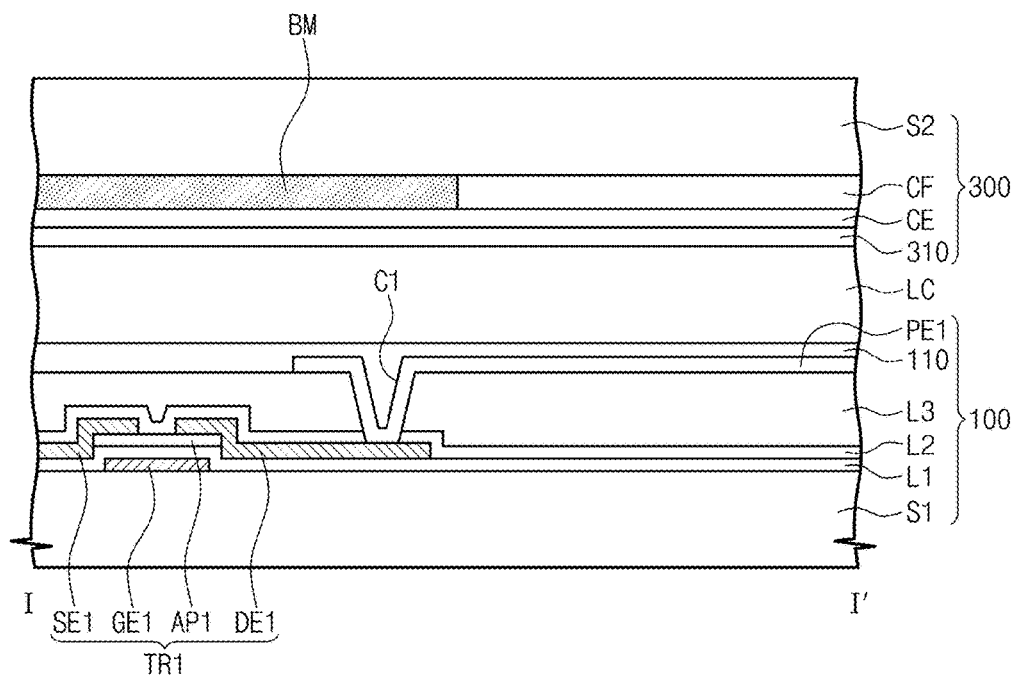
FIG. 3A is a cross-sectional view taken along a line I-I' of FIG. 2A.
Figure 3B:
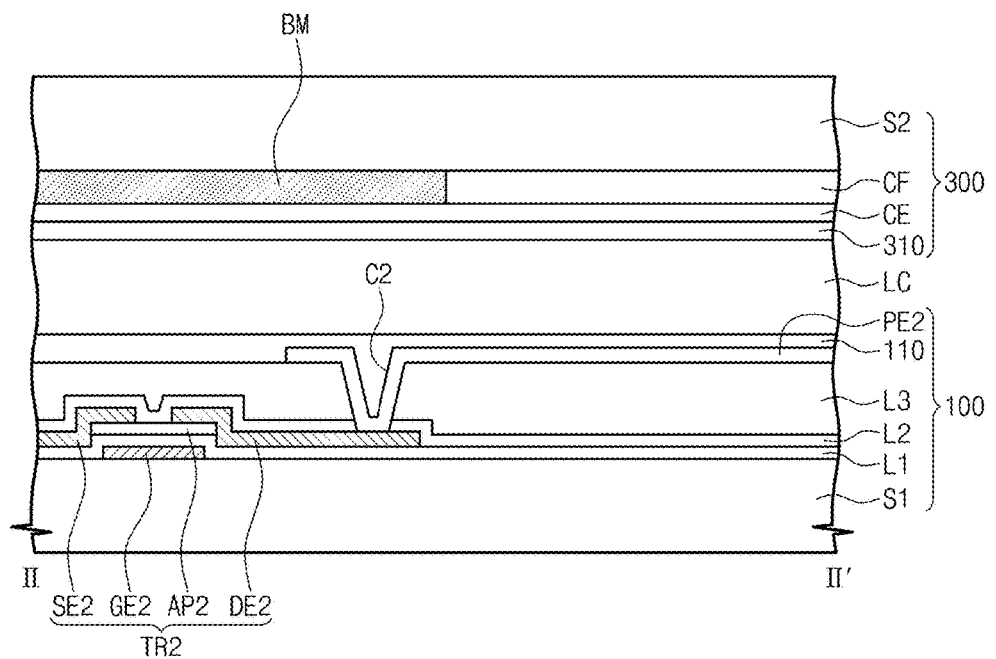
FIG. 3B is a cross-sectional view taken along a line II-II' of FIG. 2A.

FIG. 3A is a cross-sectional view taken along a line I-I' of FIG. 2A and FIG. 3B is a cross-sectional view taken along a line II-II' of FIG. 2A.

Referring to FIGS. 2A, 3A and 3B, the display substrate 100 includes a first base substrate S1, the gate line GL, the first data line DL1, the second data line DL2, the first thin film transistor TR1, the second thin film transistor TR2, the pixel electrode PE, and a first alignment layer 110.

The first base substrate S1 may be, but is not limited to, an insulating substrate that is also light transmitting and flexible, such as a plastic substrate. The gate line GL is disposed on the first base substrate S1, and the gate line GL is electrically connected to the first and second thin film transistors TR1 and TR2 to apply the gate signal to the first and second thin film transistors TR1 and TR2. The first and second data lines DL1 and DL2 are insulated from the gate line GL and disposed on the first base substrate S1. The first data line DL1 transmits the first data signal and the second data line DL2 transmits the second data signal.

In the present exemplary embodiment, the pixel electrode PE includes the first sub-pixel electrode PE1 disposed in the first sub-pixel area PA1 and the second sub-pixel electrode PE2 disposed in the second sub-pixel area PA2.

The first thin film transistor TR1 includes the first gate electrode GE1, a first active pattern AP1, the first source electrode SE1, and the first drain electrode DE1. The first gate electrode GE1 protrudes from the gate line GL, the first active pattern AP1 is disposed on the first gate electrode GE1, and a first insulating layer L1 is interposed between the first gate electrode GE1 and the first active pattern AP1. The first source electrode SE1 extends from the first data line DL1 to make contact with the first active pattern AP1, and the first drain electrode DE1 is spaced apart from the first source electrode SE1 and also makes contact with the first active pattern AP1.

A second insulating layer L2 covers the first thin film transistor TR1 and a third insulating layer L3 is disposed on the second insulating layer L2. The first sub-pixel electrode PE1 is disposed on the third insulating layer L3, and the first sub-pixel electrode PE1 makes contact with the first drain electrode DE1 through the first contact hole C1 formed through the second and third insulating layers L2 and L3.

The second thin film transistor TR2 includes the second gate electrode GE2, a second active pattern AP2, the second source electrode SE2, and the second drain electrode DE2. The second gate electrode GE2 extends out from the gate line GL, the second active pattern AP2 is disposed on the second gate electrode GE2, and the first insulating layer L1 is interposed between the second gate electrode GE2 and the second active pattern AP2. The second source electrode SE2 protrudes from the second data line DL2 to make contact with the second active pattern AP2. The second drain electrode DE2 is spaced apart from the second source electrode SE2 and also makes contact with the second active pattern AP2.

The second sub-pixel electrode PE2 is disposed on the third insulating layer L3. The second sub-pixel electrode PE2 makes contact with the second drain electrode DE2 through the second contact hole C2 formed through the second and third insulating layers L2 and L3.

In the present exemplary embodiment, each of the first and second active patterns AP1 and AP2 includes a semiconductor material, such as amorphous silicon or crystalline silicon. However, the semiconductor material included in the first and second active patterns AP1 and AP2 should not be limited thereto or thereby. For instance, each of the first and second active patterns AP1 and AP2 may include an oxide semiconductor such as IGZO, ZnO, $SnO_2$, $In_2O_3$, $Zn_2SnO_4$, $Ge_2O_3$, and $HfO_2$ or a compound semiconductor such as GaAs and GaP.

The first alignment layer 110 is disposed on the first and second sub-pixel electrodes PE1 and PE2, and makes contact with the liquid crystal layer LC. When an electric field is not formed between the display substrate 100 and the opposite substrate 300, the first alignment layer 110 aligns the liquid crystal molecules LM (refer to FIGS. 4A to 4D) of the liquid crystal layer LC to be inclined with respect to the first alignment layer 110. In this case, the liquid crystal molecules LM, which are aligned by the first alignment layer 110, are further inclined by the electric field to be horizontally aligned with respect to the display substrate 100. The liquid crystal molecules are operated in a super vertical alignment (SVA) mode in response to the electric field, as a response time of the liquid crystal display 500 is improved in the SVA mode.

The opposite substrate 300 includes a second base substrate S2, a color filter CF, a light blocking layer BM, the common electrode CE, and a second alignment layer 310. The second base substrate S2 may be, but is not limited to, an insulating substrate that is both optically transmissive and flexible.

The common electrode CE is disposed on the second base substrate S2 and generates the electric field applied to the liquid crystal layer LC in cooperation with the pixel electrode PE. The light blocking layer BM is disposed to correspond to a position of the gate line GL, the first and second data lines DL1 and DL2, and the first and second thin film transistors TR1 and TR2, and blocks light. In addition, the color filter CF is disposed on the second base substrate S2 to filter the light passing through the liquid crystal layer LC so as to produce colored light.

In the present exemplary embodiment, the light blocking layer BM and the color filter CF are disposed on the second base substrate S2. However, they should not be limited thereto or thereby. According to another embodiment, at least one of the light blocking layer BM and the color filter CF may be disposed on the first base substrate S1.

FIGS. 4A, 4B, 4C, and 4D are perspective views showing liquid crystal molecules aligned by the electric field formed between the display substrate and the opposite substrate.

Figure 4A:
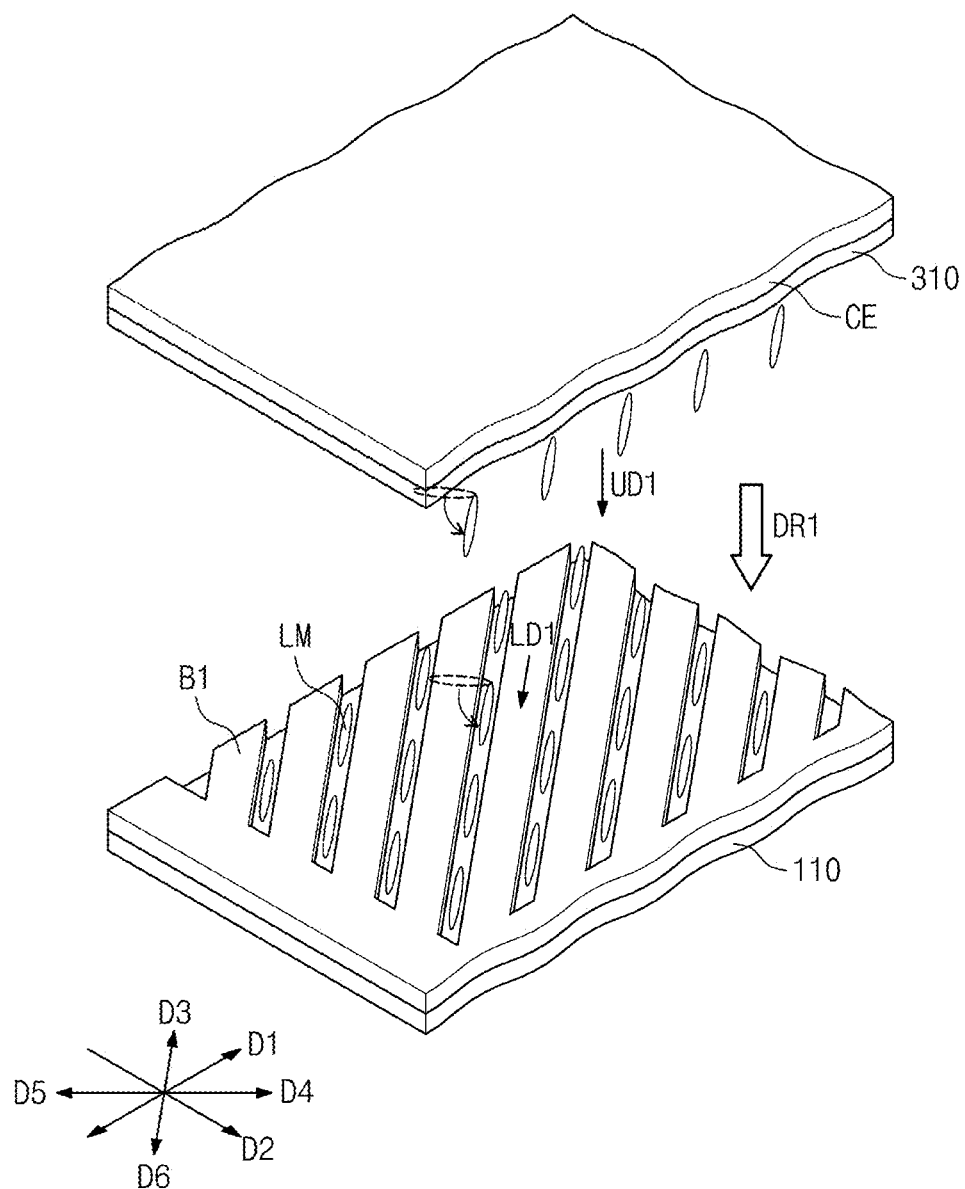
FIGS. 4A, 4B, 4C, and 4D are perspective views showing liquid crystal molecules aligned by an electric field formed between a display substrate and an opposite substrate.
Figure 4B:
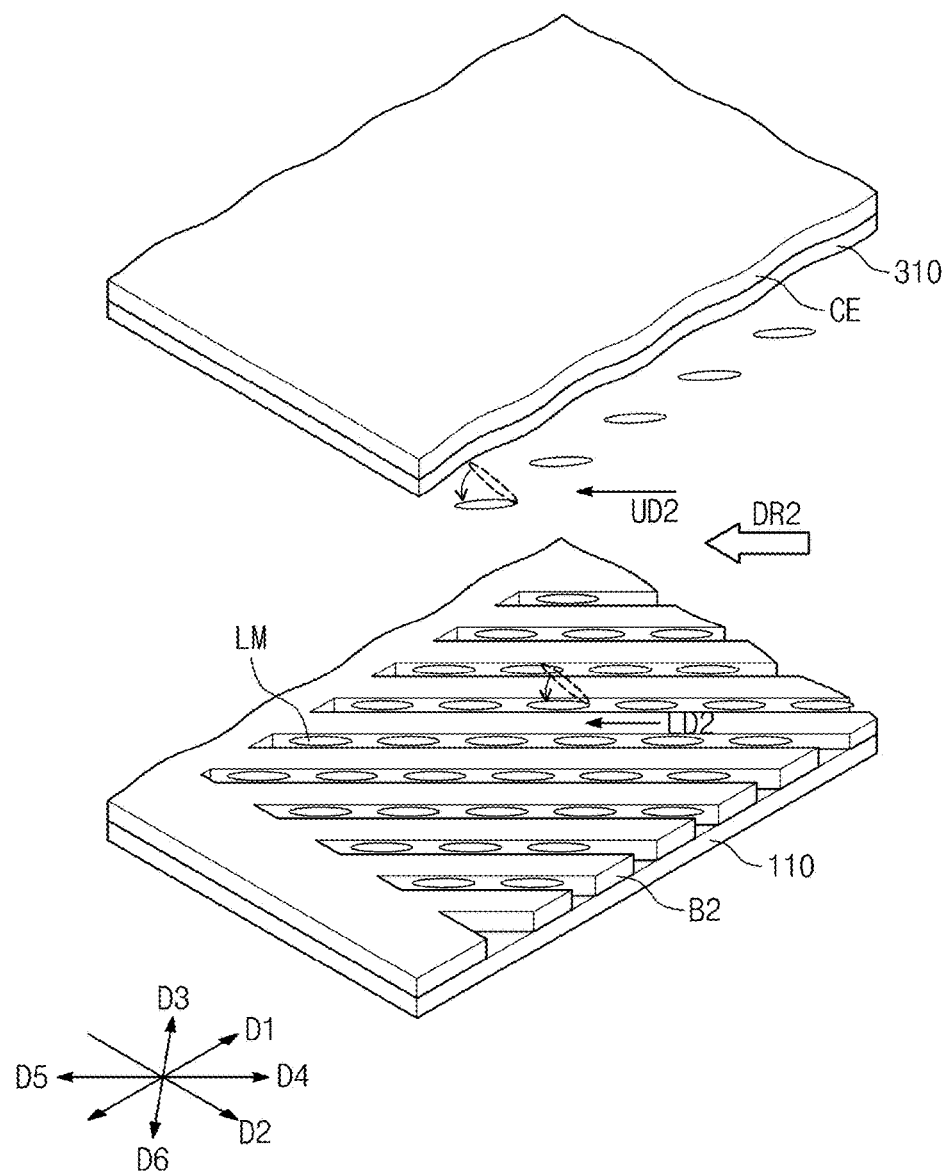
Figure 4C:
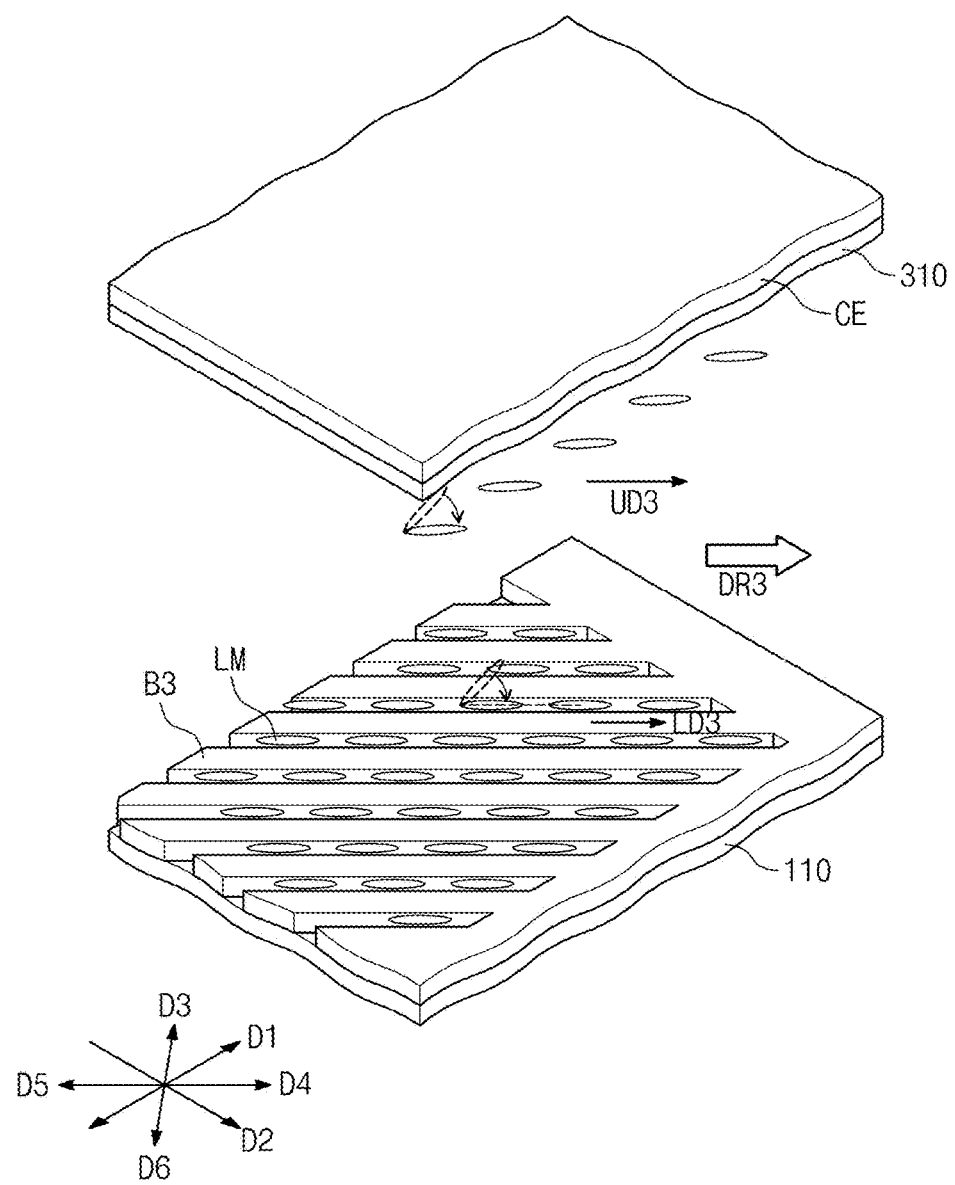
Figure 4D:
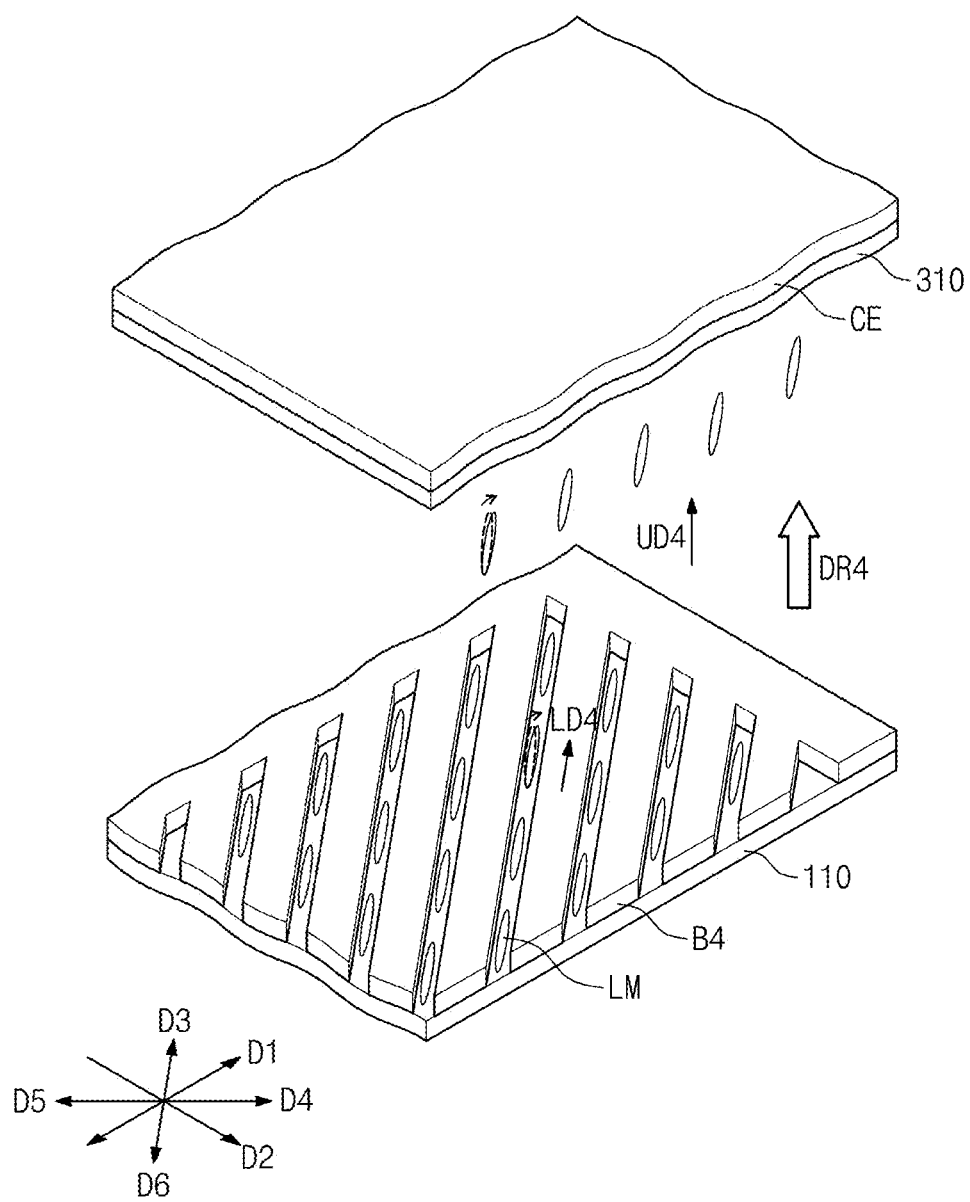

More particularly, FIG. 4A is a perspective view showing an alignment state of the liquid crystal molecules aligned by the electric field of the first branch electrodes B1, FIG. 4B is a perspective view showing an alignment state of the liquid crystal molecules aligned by the electric field of the second branch electrodes B2, FIG. 4C is a perspective view showing an alignment state of the liquid crystal molecules aligned by the electric field of the third branch electrodes B3, and FIG. 4D is a perspective view showing an alignment state of the liquid crystal molecules aligned by the electric field of the fourth branch electrodes B4.

Referring to FIGS. 4A and 2B, each of the first branch electrodes B1 extends in the third direction D3. When no electric field is formed between the display substrate 100 and the opposite substrate 300, a portion of the liquid crystal molecules disposed adjacent to the first alignment layer 110 and a portion of the liquid crystal molecules disposed adjacent to the second alignment layer 310 are pre-tilted in a predetermined direction.

In the first domain DM1, a direction to which the liquid crystal molecules LM are pre-tilted by the first alignment layer 110 is referred to as a first pre-tilt direction LD1, and a direction to which the liquid crystal molecules LM are pre-tilted by the second alignment layer 310 is referred to as a second pre-tilt direction UD1. The first and second pre-tilt directions LD1 and UD1 may be substantially the same as the sixth direction D6. That is, the liquid crystal molecules disposed adjacent to the first and second alignment layers 110 and 310 are pre-tilted in the sixth direction D6.

When the electric field is formed, the liquid crystal molecules LM disposed between the first and second alignment layers 110 and 310 are aligned in the sixth direction D6 (substantially parallel to the first branch electrodes B1 when viewed in a plan view) in response to the electric field. That is, the liquid crystal molecules LM, which are pre-tilted by the first and second alignment layers 110 and 310, are further inclined and aligned along the sixth direction D6 by the electric field.

Thus, when the electric field is applied, the liquid crystal molecules LM are aligned in the sixth direction D6, which is the same as the first and second pre-tilt directions LD1 and UD1, by the first branch electrodes B1 in the first domain DM1, and the sixth direction D6 may be defined as the first liquid crystal alignment direction DR1.

Referring to FIGS. 4B and 2B, each of the second branch electrodes B2 extends in the fourth direction D4. When no electric field is formed between the display substrate 100 and the opposite substrate 300, a portion of the liquid crystal molecules disposed adjacent to the first alignment layer 110 and a portion of the liquid crystal molecules disposed adjacent to the second alignment layer 310 in the second domain DM2 are pre-tilted in a predetermined direction.

In the second domain DM2, a direction to which the liquid crystal molecules LM are pre-tilted by the first alignment layer 110 is referred to as a third pre-tilt direction LD2, and a direction to which the liquid crystal molecules LM are pre-tilted by the second alignment layer 310 is referred to as a fourth pre-tilt direction UD2. The third and fourth pre-tilt directions LD2 and UD2 are substantially the same as the fifth direction D5. That is, the liquid crystal molecules disposed adjacent to the first and second alignment layers 110 and 310 are pre-tilted in the fifth direction D5.

When the electric field is formed, the liquid crystal molecules LM are further inclined by the electric field and aligned in the fifth direction D5 substantially parallel to the second branch electrodes B2 when viewed in a plan view. That is, the liquid crystal molecules LM, which are pre-tilted by the first and second alignment layers 110 and 310, are further inclined by the electric field and aligned along the fifth direction D5.

Thus, when the electric field is applied, the liquid crystal molecules LM are aligned in the fifth direction D5, which is the same as the third and fourth pre-tilt directions LD2 and UD2, in the second domain DM2, and the fifth direction D5 may be defined as the second liquid crystal alignment direction DR2.

Referring to FIGS. 4C and 2B, each of the third branch electrodes B3 extends in the fifth direction D5. When no electric field is formed between the display substrate 100 and the opposite substrate 300, a portion of the liquid crystal molecules disposed adjacent to the first alignment layer 110 and a portion of the liquid crystal molecules disposed adjacent to the second alignment layer 310 in the third domain DM3 are pre-tilted in a predetermined direction.

In the third domain DM3, a direction to which the liquid crystal molecules LM are pre-tilted by the first alignment layer 110 is referred to as a fifth pre-tilt direction LD3, and a direction to which the liquid crystal molecules LM are pre-tilted by the second alignment layer 310 is referred to as a sixth pre-tilt direction UD3. The fifth and sixth pre-tilt directions LD3 and UD3 are substantially the same as the fourth direction D4. That is, the liquid crystal molecules disposed adjacent to the first and second alignment layers 110 and 310 are pre-tilted in the fourth direction D4.

When the electric field is formed, the liquid crystal molecules LM are further inclined by the electric field and aligned in the fourth direction D4 substantially parallel to the third branch electrodes B3 when viewed in plan view. That is, the liquid crystal molecules LM, which are pre-tilted by the first and second alignment layers 110 and 310, are further inclined by the electric field and aligned along the fourth direction D4.

Thus, when the electric field is applied, the liquid crystal molecules LM are aligned in the fourth direction D4, which is the same as the fifth and sixth pre-tilt directions LD3 and UD3, in the third domain DM3, and the fourth direction D4 may be defined as the third liquid crystal alignment direction DR3.

Referring to FIGS. 4D and 2B, each of the fourth branch electrodes B4 extends in the sixth direction D6. When no electric field is formed between the display substrate 100 and the opposite substrate 300, a portion of the liquid crystal molecules disposed adjacent to the first alignment layer 110 and a portion of the liquid crystal molecules disposed adjacent to the second alignment layer 310 of the liquid crystal molecules LM in the fourth domain DM4 are pre-tilted in a predetermined direction.

In the fourth domain DM4, a direction to which the liquid crystal molecules LM are pre-tilted by the first alignment layer 110 is referred to as a seventh pre-tilt direction LD4, and a direction to which the liquid crystal molecules LM are pre-tilted by the second alignment layer 310 is referred to as an eighth pre-tilt direction UD4. The seventh and eighth pre-tilt directions LD4 and UD4 are substantially the same as the third direction D3. That is, the liquid crystal molecules disposed adjacent to the first and second alignment layers 110 and 310 are pre-tilted in the third direction D3.

When the electric field is formed, the liquid crystal molecules LM are further inclined by the electric field and aligned in the third direction D3 substantially parallel to the fourth branch electrodes B4 when viewed in plan view. That is, the liquid crystal molecules LM, which are pre-tilted by the first and second alignment layers 110 and 310, are further inclined by the electric field and aligned along the third direction D3.

Thus, when the electric field is applied, the liquid crystal molecules LM are aligned in the third direction D3, which is the same as the seventh and eighth pre-tilt directions LD4 and UD4, in the fourth domain DM4, and the third direction D3 may be defined as the fourth liquid crystal alignment direction DR4.

As described above, the first to fourth domains DM1 to DM4, which are sequentially arranged along the second direction D2, are arranged within the first sub-pixel area PA1. Thus, the liquid crystal alignment directions, to which the liquid crystal molecules are aligned by the electric field in the first to fourth domains DM1 to DM4, are different from each other. Thus, the viewing angle of the first sub-pixel area PA1 may be widened.

Similar to the first sub-pixel area PA1, the fifth to eighth domains DM5 to DM8 are sequentially arranged along the second direction D2 in the second sub-pixel area PA2. Thus, the liquid crystal alignment directions, to which the liquid crystal molecules are aligned by the electric field in the fifth to eighth domains DM5 to DM8, are different from each other.

Effects of the above pixel configuration will now be described with reference to the first and second domains DM1 and DM2.

Referring to FIGS. 1C, 2B, and 4A, when the liquid crystal display 500 is bent along the first direction D1, misalignment occurs between the display substrate 100 and the opposite substrate 300. In this case, the display substrate 100 and the opposite substrate 300 are misaligned with each other by the first length L1.

However, according to the exemplary embodiment of the present disclosure, since the first to eighth domains DM1 to DM8 are arranged in the second direction D2 substantially perpendicular to the first direction D1, the domains are prevented from overlapping each other due to misalignment.

In more detail, an area of the first alignment layer 110 in which the liquid crystal molecules of the display substrate 100 are pre-tilted in the first domain DM1 is referred to as a first pre-tilt area PR1, and an area of the second alignment layer 310 in which the liquid crystal molecules of the opposite substrate 300 are pre-tilted in the first domain DM1 is referred to as a second pre-tilt area PR2. When the misalignment occurs between the display substrate 100 and the opposite substrate 300 and the opposite substrate 300 is shifted by the first length L1 in the first direction D1, the second pre-tilt area PR2 is shifted by the first length L1 with respect to the first pre-tilt area PR1.

However, this pixel has no domain disposed adjacent to the first domain DM1 in the first direction D1. Thus, even though the opposite substrate 300 is shifted in the first direction D1, the shifted second pre-tilt area PR2 does not overlap another domain of the same pixel, and thus an alignment defect may be prevented from occurring. As a result, unlike conventional displays, the deterioration of the light transmittance caused by an alignment defects may be prevented.

Hereinafter, a structure of the first and second sub-pixels PE1 and PE2 according to another exemplary embodiment will be described in detail.

Figure 5:
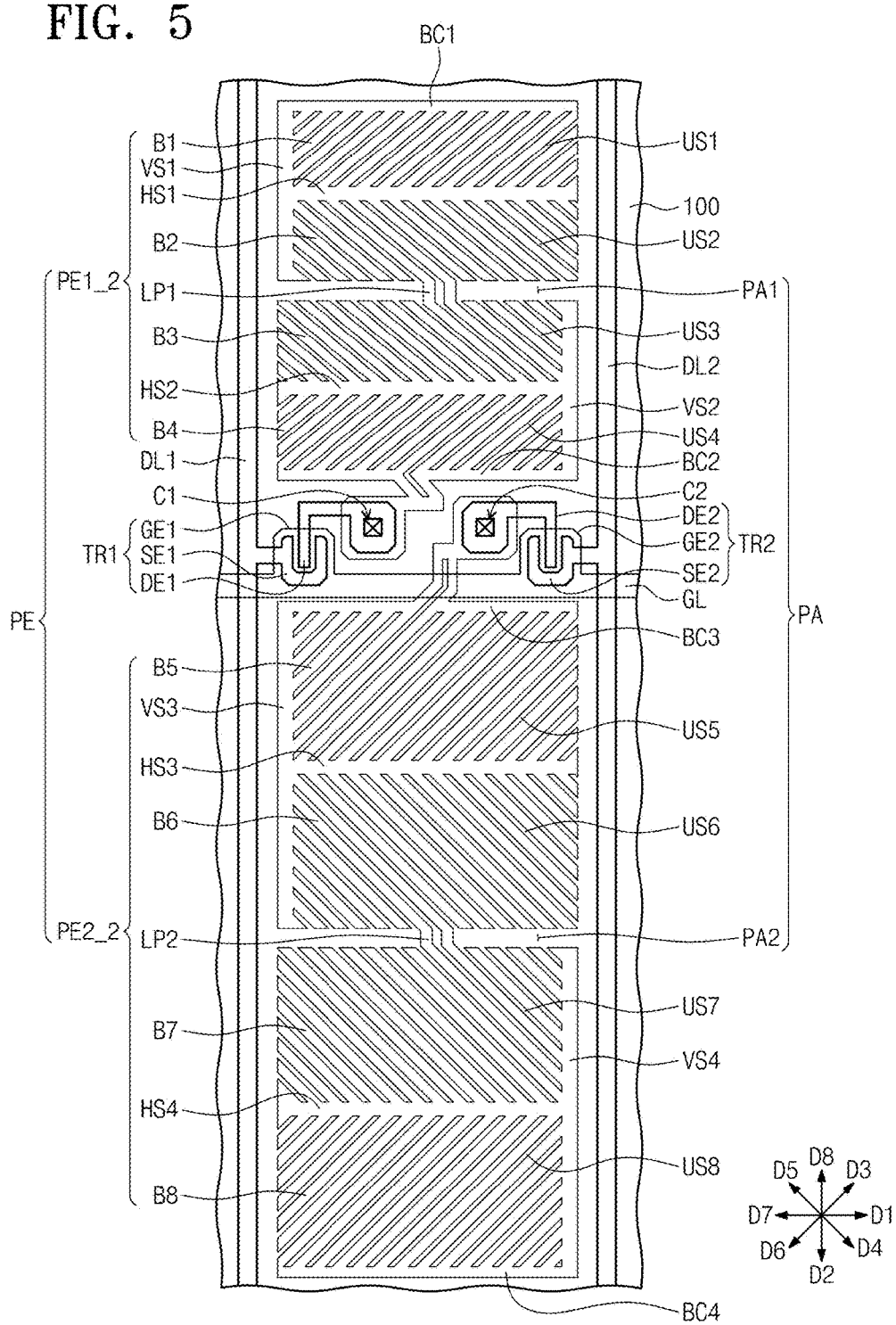
FIG. 5 is a plan view showing a pixel of a liquid crystal display according to another exemplary embodiment of the present disclosure.

FIG. 5 is a plan view showing a pixel of a liquid crystal display according to another exemplary embodiment of the present disclosure. In FIG. 5, the same reference numerals denote the same elements in previous embodiments, and thus any detailed description of the same elements will be omitted.

Referring to FIG. 5, a first sub-pixel electrode PE1_2 further includes a first branch connection electrode BC1 and a second branch connection electrode BC2. The first branch connection electrode BC1 extends in the first direction D1 to connect edges of the first branch electrodes B1, and the second branch connection electrode BC2 extends in the first direction D1 to connect edges of the fourth branch electrodes B4.

When the first domain DM1 (refer to FIG. 2B) is defined to have a quadrangular shape, two sides substantially parallel to the second direction D2 are respectively defined as a first left side and a first right side, and two sides substantially parallel to the first direction D1 are respectively defined as a first upper side and a first lower side. In particular, the first upper side is disposed adjacent to an upper pixel, which is disposed adjacent to the first domain DM1 in an eighth direction D8, i.e., an opposite direction to the first direction D1, and the first lower side is disposed adjacent to the second domain DM2 (refer to FIG. 2B).

The first branch connection electrode BC1 is disposed at the first upper side and connected to the first branch electrodes B1. Thus, the first branch connection electrode BC1 prevents an alignment control force on the liquid crystal molecules from deteriorating at a border area between the first domain DM1 and the upper pixel disposed adjacent to the first domain DM1 in the eighth direction D8.

When the fourth domain DM4 (refer to FIG. 2B) is defined to have a quadrangular shape, two sides substantially parallel to the second direction D2 are respectively defined as a second left side and a second right side, and two sides substantially parallel to the first direction D1 are respectively defined as a second upper side and a second lower side. In particular, the second upper side is disposed adjacent to the third domain DM3 and the second lower side is disposed adjacent to, or facing, the fifth domain DM5 (refer to FIG. 2B).

The second branch connection electrode BC2 is disposed at the second lower side and connected to the fourth branch electrodes B4. Thus, the second branch connection electrode BC2 prevents an alignment control force on liquid crystal molecules from deteriorating at a border area between the fourth domain DM4 and the fifth domain DM5.

The second sub-pixel electrode PE2_2 further includes a third branch connection electrode BC3 and a fourth branch connection electrode BC4. The third branch connection electrode BC3 extends in the first direction D1 to connect edges of the fifth branch electrodes B5, and the fourth branch connection electrode BC4 extends in the first direction D1 to connect edges of the eighth branch electrodes B8.

When the fifth domain DM5 is defined to have a quadrangular shape, two sides substantially parallel to the second direction D2 are respectively defined as a third left side and a third right side, and two sides substantially parallel to the first direction D1 are respectively defined as a third upper side and a third lower side. In particular, the third upper side is disposed adjacent to or facing the fourth domain DM4, and the third lower side is disposed adjacent to the sixth domain DM6 (refer to FIG. 2B).

The third branch connection electrode BC3 is disposed at the third upper side and connected to the fifth branch electrodes B5. Thus, the third branch connection electrode BC3 prevents an alignment control force on the liquid crystal molecules from deteriorating at a border area between the fourth domain DM4 and the fifth domain DM5.

When the eighth domain DM8 (refer to FIG. 2B) is defined to have a quadrangular shape, two sides substantially parallel to the second direction D2 are respectively defined as a fourth left side and a fourth right side, and two sides substantially parallel to the first direction D1 are respectively defined as a fourth upper side and a fourth lower side. In particular, the fourth upper side is disposed adjacent to the seventh domain DM7 and the fourth lower side is disposed adjacent to a lower pixel, which is disposed adjacent to the eighth domain DM8 in the second direction D2.

The fourth branch connection electrode BC4 is disposed at the fourth lower side and connected to the eighth branch electrodes B8. Thus, the fourth branch connection electrode BC4 prevents an alignment control force on the liquid crystal molecules from deteriorating at a border area between the eighth domain DM8 and the lower pixel.

Figure 6A:
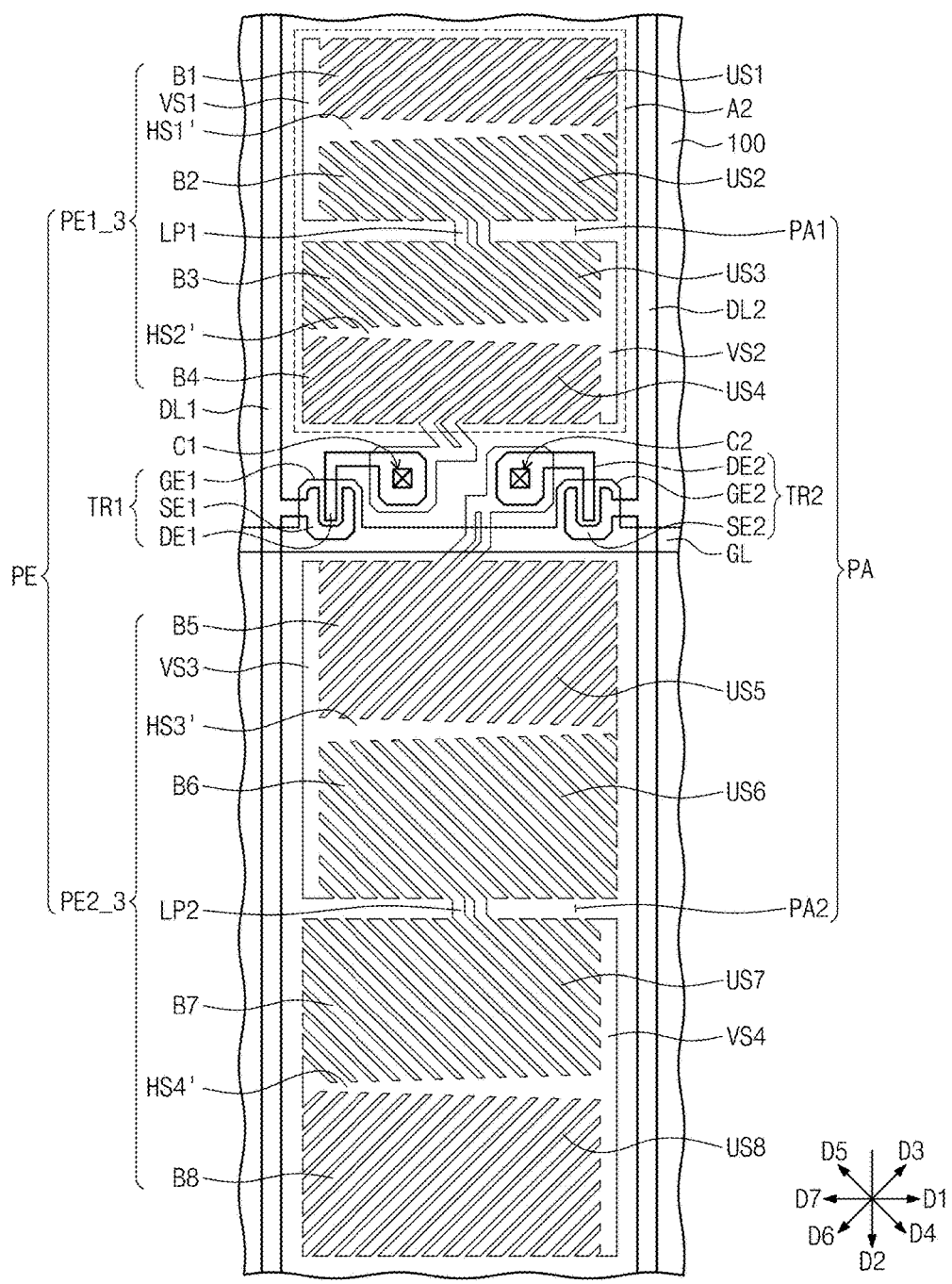
FIG. 6A is a plan view showing a pixel of a liquid crystal display according to another exemplary embodiment of the present disclosure.
Figure 6B:
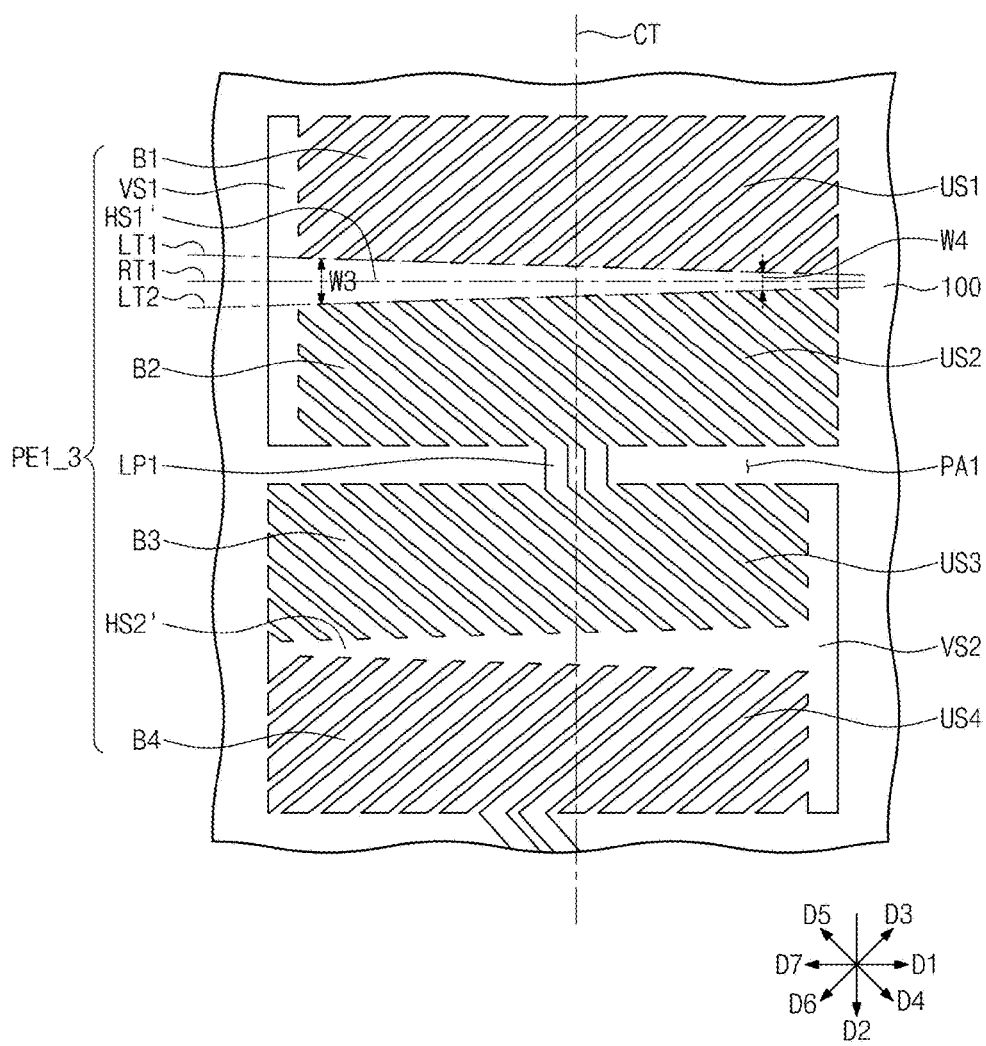
FIG. 6B is an enlarged view of a portion A2 shown in FIG. 6A.

FIG. 6A is a plan view showing a pixel of a liquid crystal display according to another exemplary embodiment of the present disclosure and FIG. 6B is an enlarged view of a portion A2 shown in FIG. 6A. In FIGS. 6A and 6B, the same reference numerals denote the same elements as in previous embodiments, and thus any detailed description of the same elements will be omitted.

Referring to FIGS. 6A and 6B, a first sub-pixel electrode PE1_3 includes a first horizontal trunk electrode HS1' and a second horizontal trunk electrode HS2', and a second sub-pixel electrode PE2_3 includes a third horizontal trunk electrode HS3' and a fourth horizontal trunk electrode HS4'. Since the first to fourth horizontal trunk electrodes HS1' to HS4' have similar structures, details of the first horizontal trunk electrode HS1' will be described as a representative example.

In the present exemplary embodiment, a width of the first horizontal trunk electrode HS1' becomes smaller as a distance from the first vertical trunk electrode VS1 increases. More particularly, as shown in FIG. 6B, when a line crossing a center or midpoint of the first horizontal trunk electrode HS1' and extending along the second direction D2 is referred to as a center line CT, the first horizontal trunk electrode HS1' disposed to the left of the center line CT has a third width w3 and the first horizontal trunk electrode HS1' disposed to the right of the center line CT has a fourth width w4. Here, the third width w3 is greater than the fourth width w4.

In addition, a line crossing a center of the first horizontal trunk electrode HS1' in the first direction D1 is referred to as a first reference line RT1, a line extending along an edge of the first horizontal trunk electrode HS1' is referred to as a first auxiliary line LT1, and a line extending along the other edge of the first horizontal trunk electrode HS1' is referred to as a second auxiliary line LT2. The first auxiliary line LT1 is inclined with respect to the first reference line RT1 at an amount that ranges from about 0.5 degrees to about 2.0 degrees, and the second auxiliary line LT2 is inclined with respect to the first reference line RT1 at an amount that ranges from about 0.5 degrees to about 2.0 degrees.

Meanwhile, as the width of the first horizontal trunk electrode HS1' decreases, an intensity of a fringe field applied to the first horizontal trunk electrode HS1' increases. Thus, as can be observed, the intensity of the fringe field increases as a respective distance from first and second right sides of first and second domains DM1 and DM2 decreases. Thus, a liquid crystal control force is improved at the first and second right sides, and an alignment defect of the liquid crystal molecules may be prevented from occurring in the edge area of the first and second domains DM1 and DM2.

Figure 7A:
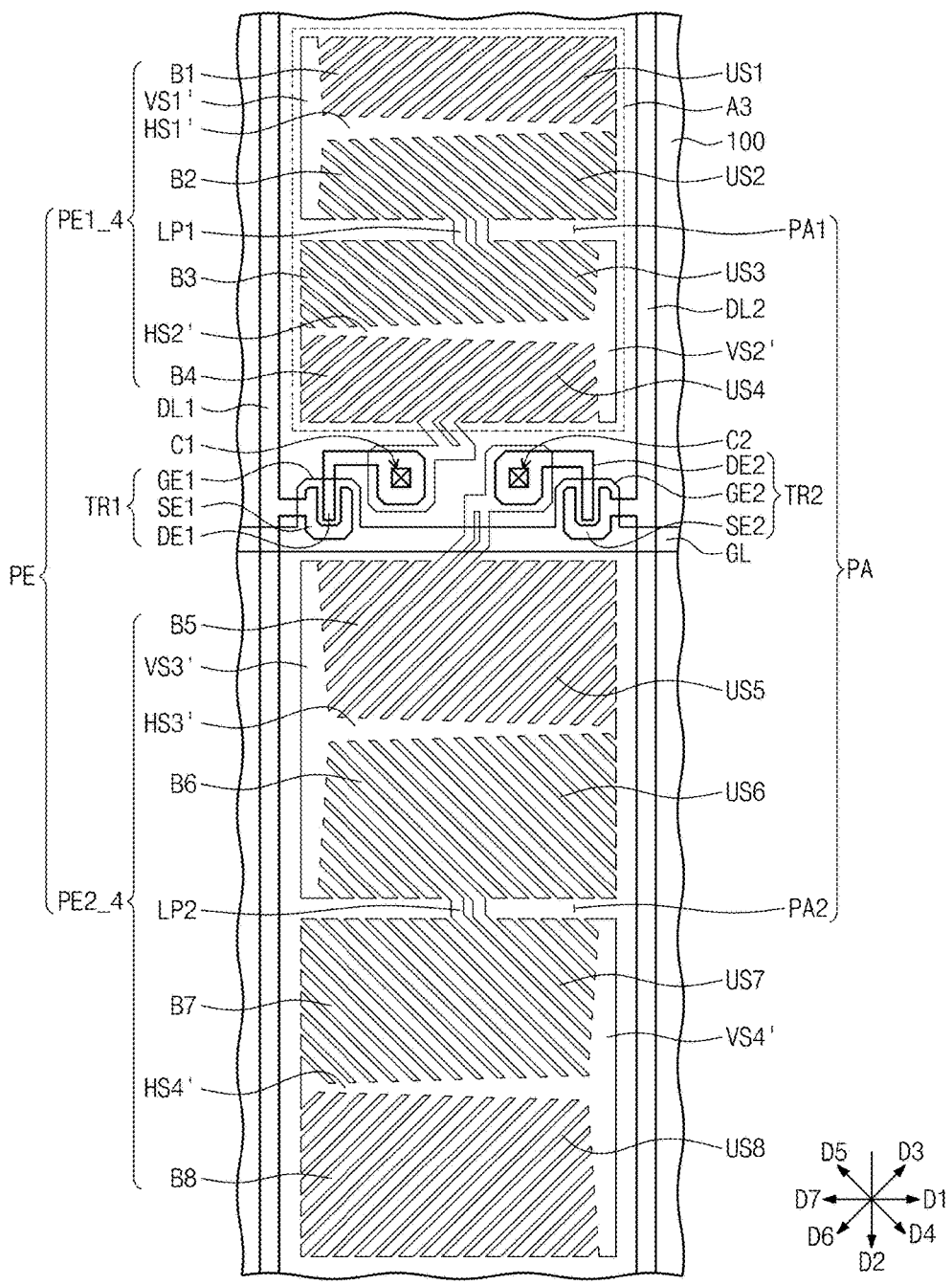
FIG. 7A is a plan view showing a pixel of a liquid crystal display according to another exemplary embodiment of the present disclosure.
Figure 7B:
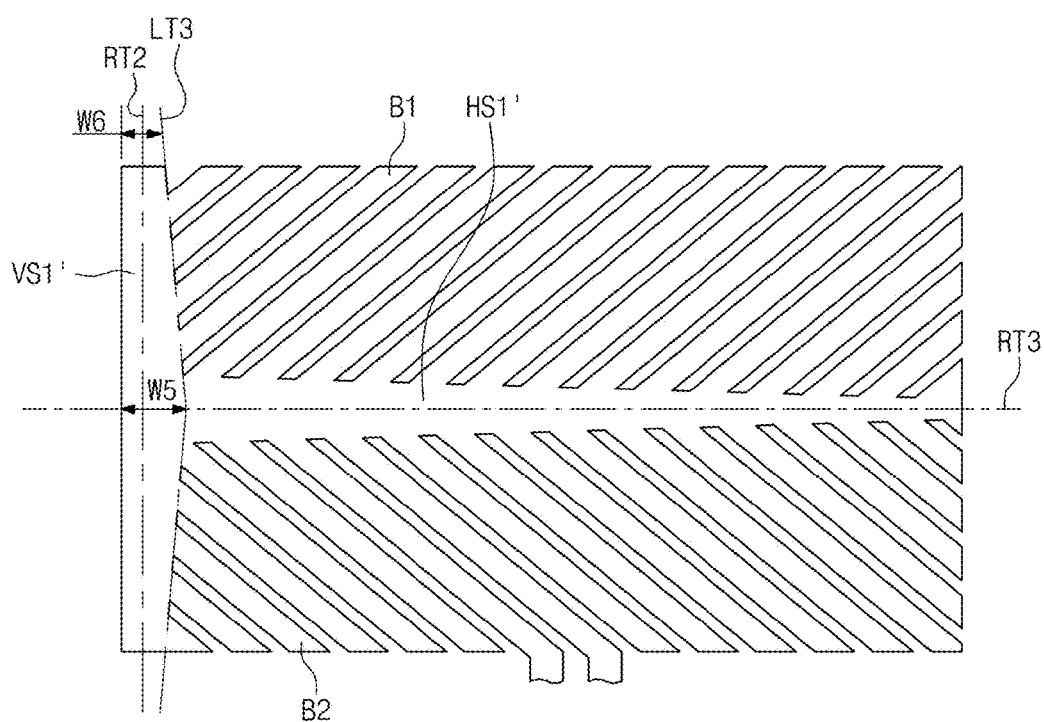
FIG. 7B is an enlarged view of a portion A3 shown in FIG. 7A.

FIG. 7A is a plan view showing a pixel of a liquid crystal display according to another exemplary embodiment of the present disclosure, and FIG. 7B is an enlarged view of a portion A3 shown in FIG. 7A. In FIGS. 7A and 7B, the same reference numerals denote the same elements as in previous embodiments, and thus a detailed description of the same elements will be omitted.

Referring to FIGS. 7A and 7B, a first sub-pixel electrode PE1_4 includes a first vertical trunk electrode VS1' and a second vertical trunk electrode VS2', and a second sub-pixel electrode PE2_4 includes a third vertical trunk electrode VS3' and a fourth vertical trunk electrode VS4'. Since the first to fourth vertical trunk electrodes VS1' to VS4' each have similar structures, details of the first vertical trunk electrode VS1' will be described as a representative example.

In the present exemplary embodiment, a width of the first vertical trunk electrode VS1' becomes smaller as a distance from its midpoint increases. More particularly, as shown in FIG. 7B, when a line crossing the center of the first vertical trunk electrode VS1' and extending along the first direction D1 is referred to as a first reference line RT3, the first vertical trunk electrode VS1' has a fifth width w5 on the first reference line RT3 and a sixth width w6 at an end portion thereof in the second direction D2. That is, the first vertical trunk electrode VS1' has tapered edges.

When a line crossing a midpoint of the outer edges of the first vertical trunk electrode VS1' is referred to as a second reference line RT2 and a line crossing edges of the first and second branch electrodes B1 and B2 (i.e. extending along the rightmost edge of the first vertical trunk electrode VS1', along the interface between the electrode VS1' and the branch electrodes B1 and B2) is referred to as a third auxiliary line LT3, the third auxiliary line LT3 is inclined with respect to the second reference line RT2 at an angle from about 0.5 degrees to about 2.0 degrees.

Meanwhile, as the width of the first vertical trunk electrode VS1' becomes smaller, an intensity of a fringe field applied to the first vertical trunk electrode VS1' increases. Thus, as described above, in the case that the width of the first vertical trunk electrode VS1' decreases with distance from its center, the intensity of the fringe field increases at outer edges of the electrode VS1'. Thus, a liquid crystal control force is improved at the first upper side and the second lower side, and an alignment defect of the liquid crystal molecules may be prevented from occurring at the edges of the first and second domains DM1 and DM2.

Figure 8A:
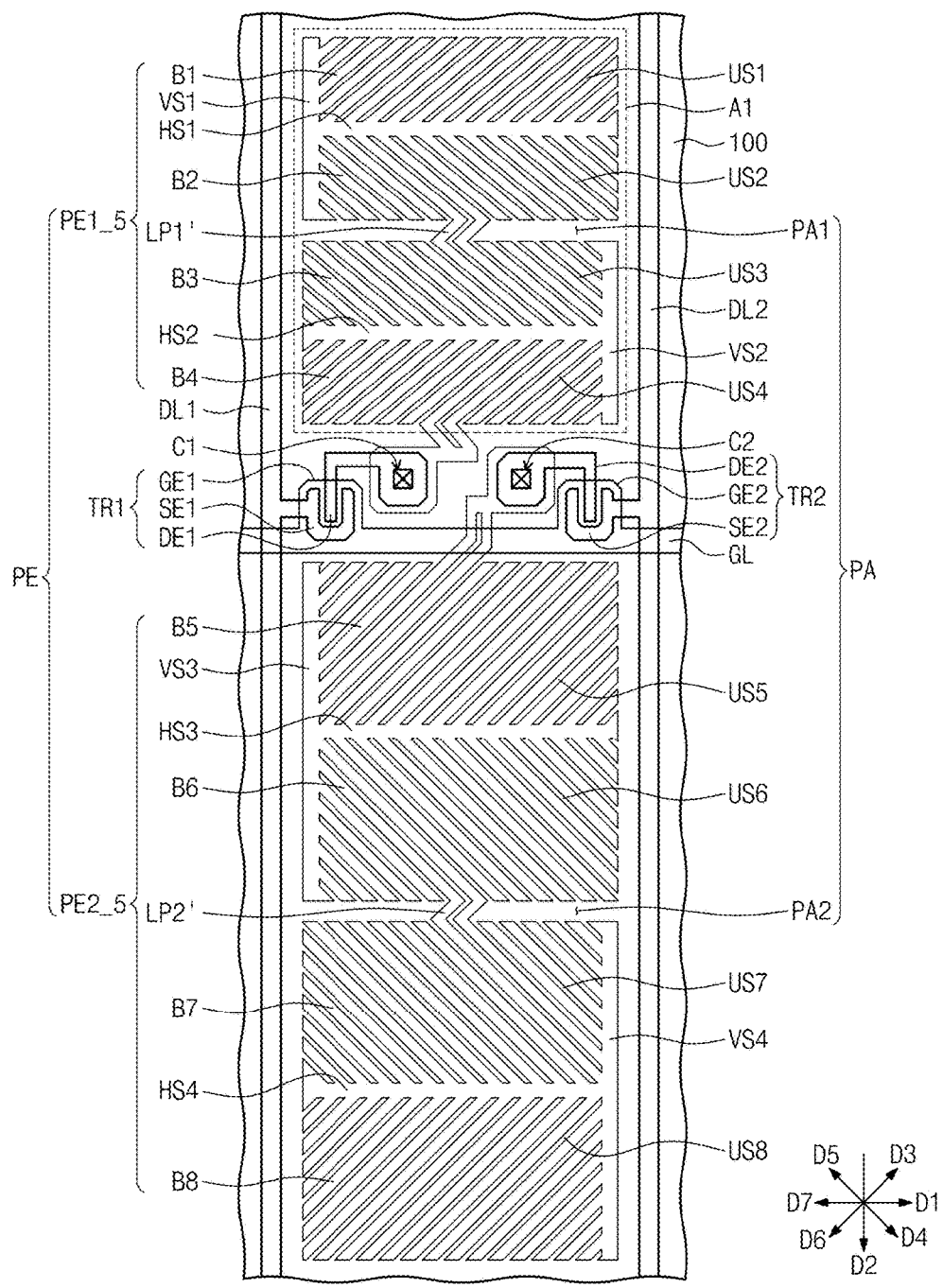
FIG. 8A is a plan view showing a pixel of a liquid crystal display according to another exemplary embodiment of the present disclosure.
Figure 8B:
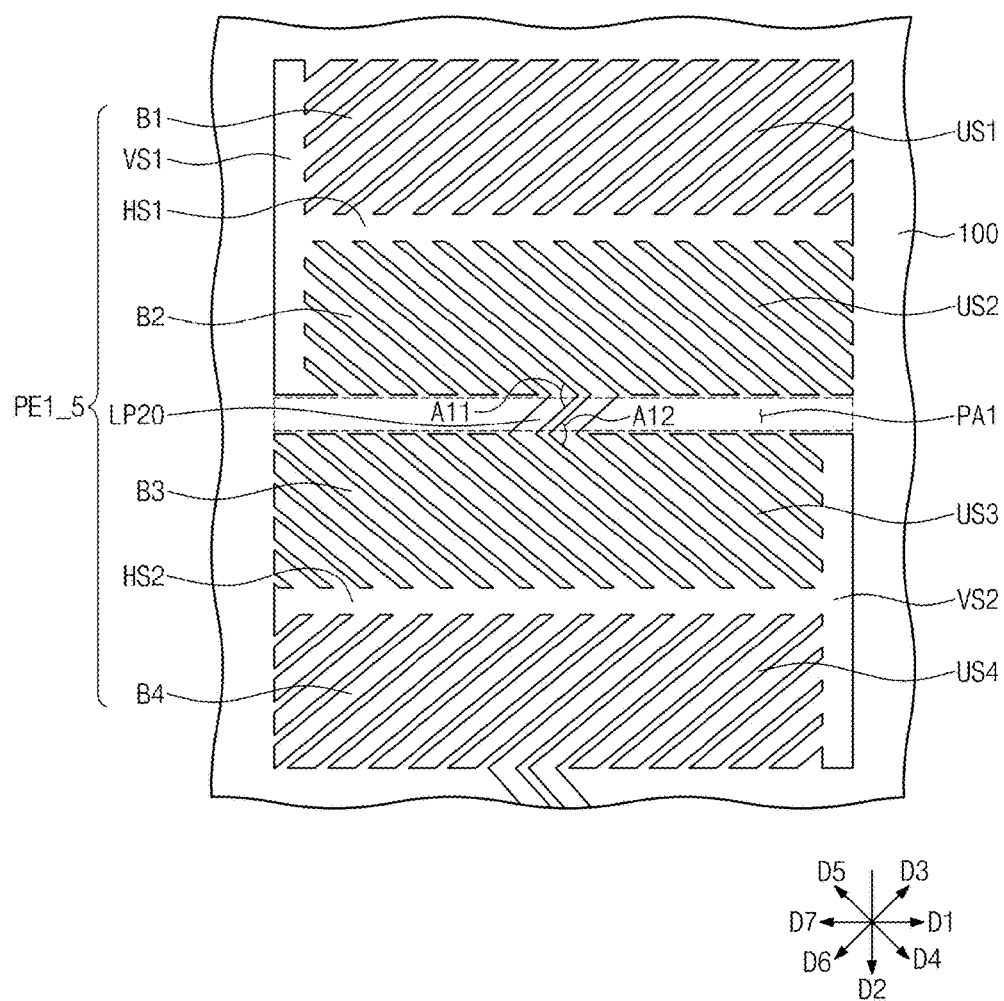
FIG. 8B is an enlarged view of a portion A4 shown in FIG. 8A.

FIG. 8A is a plan view showing a pixel of a liquid crystal display according to another exemplary embodiment of the present disclosure, and FIG. 8B is an enlarged view of a portion A4 shown in FIG. 8A. In FIGS. 8A and 8B, the same reference numerals denote the same elements as in previous embodiments, and thus a detailed description of the same elements will be omitted.

Referring to FIGS. 8A and 8B, a first sub-pixel electrode PE1_5 further includes a first domain connection electrode LP1' and a second sub-pixel electrode PE2_5 further includes a second domain connection electrode LP2'.

Since the first domain connection electrode LP1' and the second domain connection electrode LP2' have similar structures, details of the first domain connection electrode LP1' will be described as a representative example.

The first domain connection electrode LP1' may include two electrodes arranged substantially parallel to each other, and each electrode electrically connects one of the adjacent branch electrodes to the other adjacent branch electrode. However, the number of electrodes included in the first domain connection electrode LP1' should not be limited to two.

In the exemplary embodiment shown in FIG. 2A, the first domain connection electrode LP1 (refer to FIG. 2), which connects the second branch electrodes B2 and the third branch electrodes B3, is disposed at the center of the border area between the second domain and the third domain and is arranged to extend substantially parallel to the second direction D2. However, according to the present exemplary embodiment shown in FIGS. 8A and 8B, the first domain connection electrode LP1' extends in a direction crossing the second branch electrodes B2 and the third branch electrodes B3. As an exemplary embodiment of the present disclosure, the first domain connection electrode LP1' may be inclined at an angle A11 that is from about 60 degrees to about 120 degrees with respect to the fourth direction D4 in which the second branch electrodes B2 extend. Similarly, the first domain connection electrode LP1' may be inclined at an angle A12 that is from about 60 degrees to about 120 degrees with respect to the fifth direction D5 in which the third branch electrodes B3 extend.

When the first domain connection electrode LP1' extends at a different direction from the fourth and fifth directions D4 and D5, the first domain connection electrode LP1' connects the second branch electrodes B2 and the third branch electrodes B3 in a zigzag form or shape. Thus, the first domain connection electrode LP1' may be prevented from acting as a branch electrode of the second and third domains DM2 and DM3, and a liquid crystal alignment direction may become clearer or more defined at the border area between the second domain DM2 and the third domain DM3.

Figure 9:
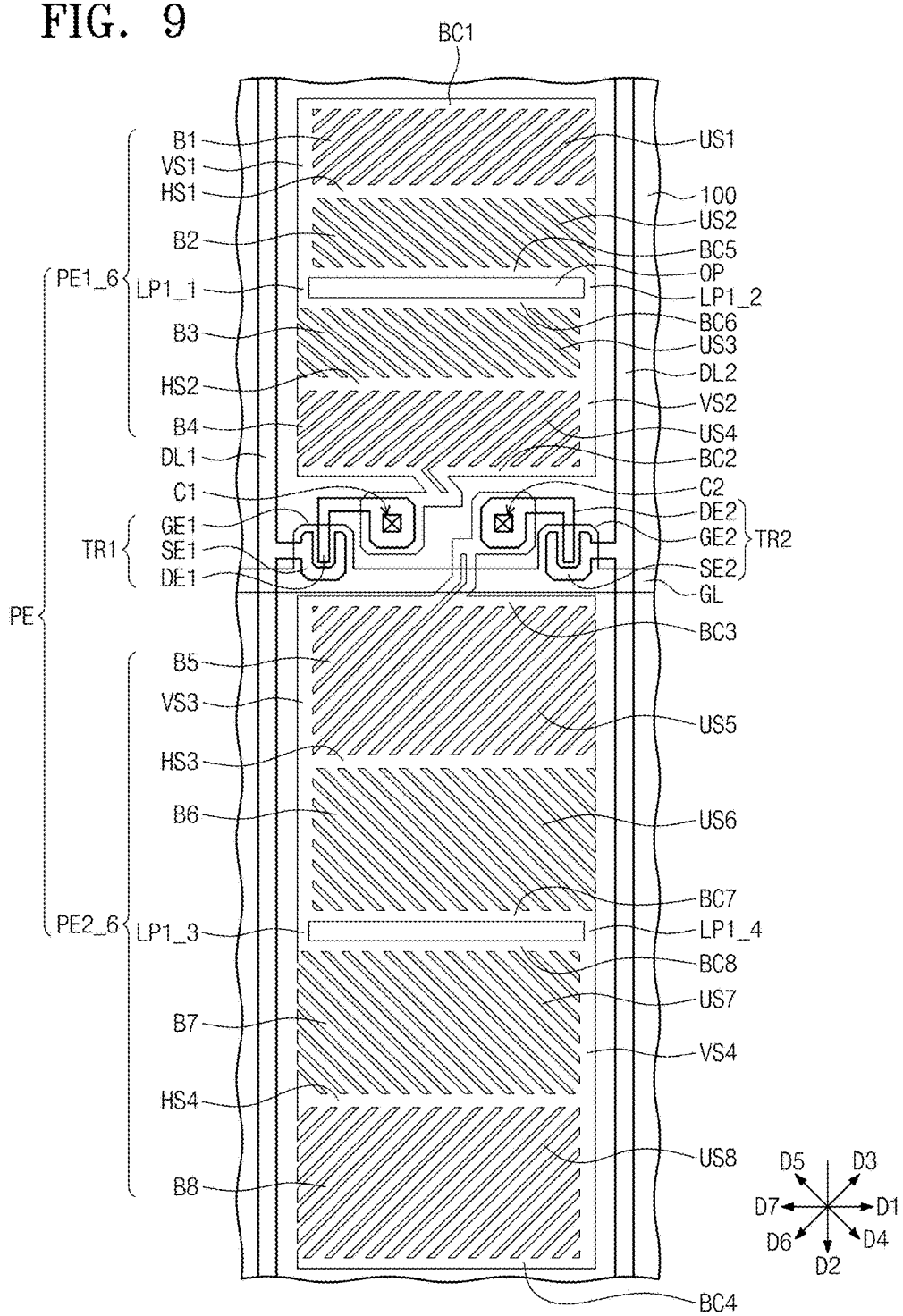
FIG. 9 is a plan view showing a pixel of a liquid crystal display according to another exemplary embodiment of the present disclosure.

FIG. 9 is a plan view showing a pixel of a liquid crystal display according to another exemplary embodiment of the present disclosure. In FIG. 9, the same reference numerals denote the same elements as in previous embodiments, and thus a detailed description of the same elements will be omitted.

Referring to FIG. 9, a first sub-pixel electrode PE1_6 further includes a fifth branch connection electrode BC5, a sixth branch connection electrode BC6, a first domain connection electrode LP1_1, and a second domain connection electrode LP1_2. A second sub-pixel electrode PE2_6 further includes a seventh branch connection electrode BC7, an eighth branch connection electrode BC8, a third domain connection electrode LP1_3, and a fourth domain connection electrode LP1_4.

The fifth branch connection electrode BC5 extends in the first direction D1 to connect edges of the second branch electrodes B2 to each other, and the sixth branch connection electrode BC6 extends in the first direction D1 to connect edges of the third branch electrodes B3 to each other. The fifth and sixth branch connection electrodes BC5 and BC6 are disposed at a border area between the second domain DM2 and the third domain DM3. As described above, since the edges of the second branch electrodes B2 are connected by the fifth branch connection electrode BC5, a fringe field applied to the second branch electrodes B2 may be prevented from being applied to the third domain DM3. In addition, since the edges of the third branch electrodes B3 are connected by the sixth branch connection electrode BC6, a fringe field applied to the edge of the third branch electrodes B3 may be prevented from being applied to the second domain DM2. As a result, an alignment defect of the liquid crystal molecules may be prevented from occurring between the second domain DM2 and the third domain DM3.

The seventh branch connection electrode BC7 extends in the first direction D1 to connect edges of the sixth branch electrodes B6 to each other, and the eighth branch connection electrode BC8 extends in the first direction D1 to connect edges of the seventh branch electrodes B7 to each other. The seventh and eighth branch connection electrodes BC7 and BC8 are disposed at a border area between the sixth domain DM6 and the seventh domain DM7. As a result, an alignment defect of liquid crystal molecules may be prevented from occurring between the sixth domain DM6 and the seventh domain DM7 by forming the seventh and eighth branch connection electrodes BC7 and BC8.

Since the first and second domain connection electrodes LP1_1 and LP1_2 have similar structure and function as those of the third and fourth domain connection electrodes LP1_3 and LP1_4, details of the first and second domain connection electrodes LP1_1 and LP1_2 will be described as a representative example.

In the exemplary embodiment shown in FIG. 2A, the first domain connection electrode LP1 (refer to FIG. 2A) connecting the second branch electrodes B2 and the third branch electrodes B3 is disposed at the center portion of the border area between the second domain DM2 and the third domain DM3, and is oriented substantially parallel to the second direction D2. However, according to the present exemplary embodiment shown in FIG. 9, the first and second domain connection electrodes LP1_1 and LP1_2 are respectively disposed at both sides of the border area between the second and third domains DM2 and DM3 to electrically connect the fifth branch connection electrode BC5 and the sixth branch connection electrode BC6. The first sub-pixel electrode PE1_6 is provided with an opening OP, which exposes the area between the fifth branch connection electrode BC5 and the sixth branch connection electrode BC6 to more clearly delineate the border area between the second and third domains DM2 and DM3.

Figure 10A:
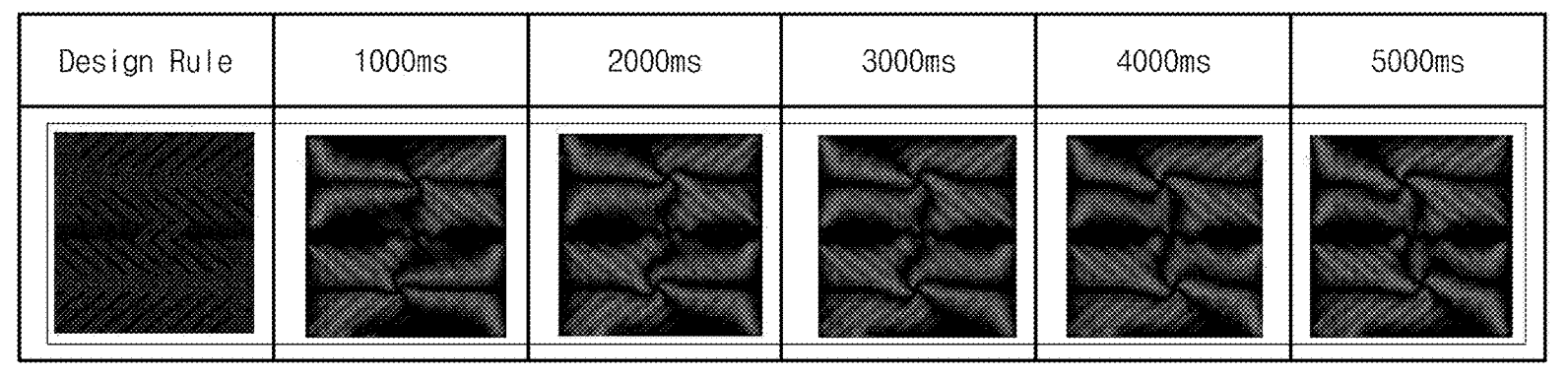
Figure 10B:
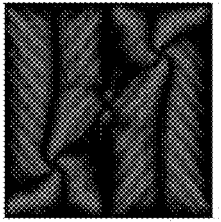
FIG. 10B is a view showing a liquid crystal alignment state according to a time lapse in an alternating branch electrode structure.

FIG. 10A is a view showing a liquid crystal alignment state according to a time lapse in a non-alternating branch electrode structure, and FIG. 10B is a view showing a liquid crystal alignment state according to a time lapse in an alternating branch electrode structure.

FIG. 10A shows the liquid crystal alignment state in first to fourth domains DM1 to DM4 when a first sub-pixel electrode is formed in a non-alternating branch electrode structure. In the non-alternating branch electrode structure, the first and second branch electrodes B1 and B2 are not disposed in alternating manner, the second and third branch electrodes B2 and B3 are not disposed in alternating manner, and the third and fourth branch electrodes B3 and B4 are not disposed in alternating manner.

In the non-alternating branch electrode structure, a misalignment area in which the liquid crystal is abnormally aligned appears in a left upper side of the first domain DM1 and a left lower side of the second domain DM2. Also, a misalignment area appears in a right upper side of the third domain DM3 and a right lower side of the fourth domain DM4. The misalignment area appears stable after a time of about 5000 ms elapses from the time point at which the electric field is applied to the liquid crystal layer, and the size of the misalignment area is not significantly reduced. Thus, the overall transmittance of the liquid crystal display adopting the non-alternating branch electrode structure is deteriorated due to the misalignment area.

FIG. 10B shows a liquid crystal alignment state in the first to fourth domains DM1 to DM4 when the first sub-pixel electrode has an alternating branch electrode structure. In the alternating branch electrode structure, the first and second branch electrodes B1 and B2 are disposed in alternating manner, the second and third branch electrodes B2 and B3 are disposed in alternating manner, and the third and fourth branch electrodes B3 and B4 are disposed in alternating manner.

In the alternating branch electrode structure, a misalignment area in which the liquid crystal is abnormally aligned appears in the left upper side of the first domain DM1 and the left lower side of the second domain DM2, but the size of the misalignment area is smaller than that of the non-alternating branch electrode structure. In addition, the misalignment area appears in the right upper side of the third domain DM3 and the right lower side of the fourth domain DM4, but its size is also smaller than that of the non-alternating branch electrode structure. Consequently, the alternating branch electrode structure has the transmittance higher than that of the non-alternating branch electrode structure.

As can be seen, the size of the misalignment areas in the alternating branch electrode structure shrinks with elapsed time. Furthermore, the size of the misalignment areas continues to shrink after 5000 ms, thus further improving transmittance.

Figure 11:
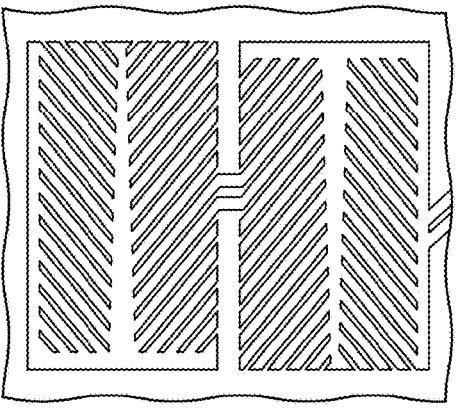
FIG. 11 is a table showing a comparison of brightness in a non-alternating branch electrode structure to brightness in an alternating branch electrode structure.

FIG. 11 is a table showing a comparison of the brightness in the non-alternating branch electrode structure to that of the alternating branch electrode structure.

Referring to FIG. 11, as shown in a comparative example, when branch electrodes arranged in two domains disposed adjacent to each other have the non-alternating branch electrode structure in which the branch electrodes are not arranged in alternating manner, a liquid crystal display has a brightness of about 0.047179.

However, in the case that the liquid crystal display has an alternating branch electrode structure as in the first exemplary embodiment shown in FIG. 6B, the liquid crystal display has a brightness of about 0.047843, which is an increase of about 1.4% relative to the comparative example. That is, when the first and second branch electrodes B1 and B2 are arranged in alternating manner, the second and third branch electrodes B2 and B3 are arranged in alternating manner, and the third and fourth branch electrodes B3 and B4 are arranged in alternating manner, the brightness of the liquid crystal display increases by about 1.4%.

In addition, in the case that the liquid crystal display has an alternating branch electrode structure as in the second exemplary embodiment shown in FIG. 5, the edges of the first branch electrodes B1 are connected to each other by the first branch connection electrode BC1 and the edges of the fourth branch electrodes B4 are connected to each other by the second branch connection electrode BC2. When the edges of the first branch electrodes B1 are connected to each other and the edges of the fourth branch electrodes B4 are connected to each other, the liquid crystal display has a brightness of about 0.048568, which is an increase of about 2.6% relative to the comparative example.

Thus, the alternating branch electrode structure has a pixel transmittance higher than that of the non-alternating branch electrode structure.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed. Various features of the above described and other embodiments can be mixed and matched in any manner, to produce further embodiments consistent with the invention.

What is claimed is:

1. A liquid crystal display comprising:
a display substrate comprising a plurality of pixel electrodes arranged along a first direction;
an opposite substrate facing the display substrate and coupled to the display substrate; and
a liquid crystal layer interposed between the display substrate and the opposite substrate,
wherein each pixel electrode comprises a first domain, a second domain, a third domain and a fourth domain successively arranged along a second direction substantially perpendicular to the first direction, and further comprises branch electrodes positioned within each domain to be inclined with respect to the first and second directions, the branch electrodes of two domains adjacent to each other in the second direction being arranged in alternating manner;
wherein the first domain, the second domain, the third domain, and the fourth domain are defined in each of the pixel electrodes, and each of the pixel electrodes further comprises:
first branch electrodes disposed in the first domain and extending in a third direction;
second branch electrodes disposed in the second domain and extending in a fourth direction;
a first horizontal trunk electrode disposed between the first domain and the second domain and having a rectangular shape having opposing edges extending along the first direction, the first and second branch electrodes extending from the opposing edges of the first horizontal trunk electrode, respectively;
third branch electrodes disposed in the third domain and extending in a fifth direction;
fourth branch electrodes disposed in the fourth domain and extending in a sixth direction; and
a second horizontal trunk electrode disposed between the third domain and the fourth domain and having opposing edges extending along the first direction, the third and fourth branch electrodes extending from the opposing edges of the second horizontal trunk electrode, respectively,
wherein each of the second branch electrodes is shifted in the first direction relative to the corresponding first branch electrodes, the first branch electrodes have a shape substantially asymmetrical to a shape of the second branch electrodes with respect to the first horizontal trunk electrode,
wherein each of the fourth branch electrodes is shifted in a seventh direction opposite to the first direction relative to the corresponding third branch electrodes, the third branch electrodes have a shape substantially asymmetrical to a shape of the fourth branch electrodes with respect to the second horizontal trunk electrode,
wherein each of the third branch electrodes is shifted in the seventh direction, relative to the corresponding second branch electrodes,
wherein each of the second branch electrodes has a first width, each of the third branch electrodes is shifted in the seventh direction opposite to the first direction by a half of the first width, relative to the corresponding second branch electrodes.

2. The liquid crystal display of claim 1, wherein the branch electrodes of each domain are successively arranged along the first direction and spaced apart from each other.

3. The liquid crystal display of claim 2, wherein the third direction is inclined in a counter-clockwise direction with respect to the first direction, the fourth direction is inclined in a clockwise direction with respect to the first direction, the fifth direction is opposite to the fourth direction, and the sixth direction is opposite to the third direction.

4. The liquid crystal display of claim 3, wherein a first angle between the first direction and the third direction is about +45 degrees, and a second angle between the first direction and the fourth direction is about −45 degrees.

5. The liquid crystal display of claim 2, wherein first center lines of the second branch electrodes are arranged in alternating manner with second center lines of the third branch electrodes.

6. The liquid crystal display of claim 2, wherein:
each of the first to fourth branch electrodes has the first width;

each of the first to fourth slits has a second width, the first width being greater than the second width;

each of the second branch electrodes is shifted in the first direction by a half of the first width, relative to the corresponding first branch electrodes; and each of the fourth branch electrodes is shifted in the first direction by the half of the first width, relative to the corresponding third branch electrodes.

7. The liquid crystal display of claim 2, wherein each of the pixel electrodes further comprises:

a first vertical trunk electrode extending in the second direction and connected to the first branch electrodes, the second branch electrodes, and the first horizontal trunk electrode; and a second vertical trunk electrode extending in the second direction and connected to the third branch electrodes, the fourth branch electrodes, and the second horizontal trunk electrode.

8. The liquid crystal display of claim 7, wherein a width of the first horizontal trunk electrode decreases with distance from the first vertical trunk electrode, and a width of the second horizontal trunk electrode decreases with distance from the second vertical trunk electrode.

9. The liquid crystal display of claim 7, wherein at least one of the first vertical trunk electrode and the second vertical trunk electrode has a width that decreases with distance from a center portion thereof.

10. The liquid crystal display of claim 2, wherein each of the pixel electrodes further comprises a domain connection electrode disposed between the second domain and the third domain to electrically connect the second branch electrodes and the third branch electrodes.

11. The liquid crystal display of claim 10, wherein the domain connection electrode is disposed proximate to a center of an interface between the second domain and the third domain.

12. The liquid crystal display of claim 11, wherein the domain connection electrode is inclined in a direction substantially parallel to the first branch electrodes and the fourth branch electrodes.

13. The liquid crystal display of claim 1, wherein each of the pixel electrodes further comprises:

a first branch connection electrode extending in the first direction and connecting edges of the first branch electrodes to each other; and a second branch connection electrode extending in the first direction and connecting edges of the fourth branch electrodes to each other.

14. The liquid crystal display of claim 13, wherein each of the pixel electrodes further comprises:

a third branch connection electrode extending in the first direction and connecting edges of the second branch electrodes to each other; and a fourth branch connection electrode extending in the first direction and connecting edges of the third branch electrodes to each other.

15. The liquid crystal display of claim 14, wherein each of the pixel electrodes further comprises a domain connection electrode disposed between the second domain and the third domain to electrically connect the third branch connection electrode and the fourth branch connection electrode.

16. The liquid crystal display of claim 15, wherein the domain connection electrode is disposed proximate to both opposing ends of an interface between the second domain and the third domain.

17. The liquid crystal display of claim 1, wherein the opposite substrate comprises a common electrode arranged so as to generate an electric field in cooperation with the pixel electrodes.

18. The liquid crystal display of claim 17, wherein liquid crystal alignment directions, in which liquid crystal molecules are inclined in response to the electric field, are different in each domain.

19. The liquid crystal display of claim 18, wherein the pixel electrodes are disposed in pixel areas, each of the pixel areas comprises first and second sub-pixel areas, and each of the pixel electrodes comprises:

a first sub-pixel electrode disposed in a corresponding first sub-pixel area of the first sub-pixel areas; and a second sub-pixel electrode disposed in a corresponding second sub-pixel area of the second sub-pixel areas.

20. The liquid crystal display of claim 19, wherein each of the first sub-pixel areas comprises a first domain, a second domain, a third domain, and a fourth domain arranged in order along the second direction, and each of the second sub-pixel areas comprises a fifth domain, a sixth domain, a seventh domain, and an eighth domain arranged in order along the second direction.

21. The liquid crystal display of claim 1, wherein the display substrate comprises a first alignment layer arranged to align liquid crystal molecules of the liquid crystal layer, and the opposite substrate comprises a second alignment layer arranged to align the liquid crystal molecules.

22. The liquid crystal display of claim 21, wherein, in each domain, the first alignment layer is arranged to impart a first pre-tilt to the liquid crystal molecules, the second alignment layer is arranged to impart a second pre-tilt to the liquid crystal molecules, and a direction of the first pre-tilt is substantially the same as a direction of the second pre-tilt.

* * * * *